United States Patent
Huang et al.

(10) Patent No.: US 11,979,450 B2
(45) Date of Patent: May 7, 2024

(54) COMMUNICATION METHOD AND APPARATUS

(71) Applicant: HUAWEI TECHNOLOGIES CO., LTD., Shenzhen (CN)

(72) Inventors: Qufang Huang, Shenzhen (CN); Jingwang Ma, Shanghai (CN); Yuejun Wei, Shanghai (CN); Nijun Li, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/994,043

(22) Filed: Nov. 25, 2022

(65) Prior Publication Data

US 2023/0093435 A1 Mar. 23, 2023

Related U.S. Application Data

(63) Continuation of application No. PCT/CN2021/093455, filed on May 12, 2021.

(30) Foreign Application Priority Data

May 28, 2020 (CN) .......................... 202010470358.6

(51) Int. Cl.
  *G06F 13/00* (2006.01)
  *H04L 65/60* (2022.01)
  *H04L 65/80* (2022.01)

(52) U.S. Cl.
  CPC .............. *H04L 65/80* (2013.01); *H04L 65/60* (2013.01)

(58) Field of Classification Search
  CPC ..... H04L 41/5067; H04L 65/80; H04L 65/60; H04W 28/0268; H04W 28/24
  (Continued)

(56) References Cited

U.S. PATENT DOCUMENTS 10,477,105 B2 * 11/2019 Ye .......................... H04N 21/00
2018/0359189 A1 * 12/2018 Ye ......................... H04N 23/698
(Continued)

FOREIGN PATENT DOCUMENTS

CN 110622506 A 12/2019
CN 110999377 A 4/2020

OTHER PUBLICATIONS

Intel, Tencent, Qualcomm, Samsung, Service Requirements for Cloud Rendering Gaming. 3GPP TSG-SA WG1 Meeting #85, Tallin, Estonia, Feb. 18-22, 2019, S1-190451, 5 pages.
(Continued)

*Primary Examiner* — Kenneth R Coulter
(74) *Attorney, Agent, or Firm* — James Harrison

(57) ABSTRACT

A communication method includes receiving, by a first communication apparatus, indication information from a second communication apparatus, and determining, by the first communication apparatus, a first quality of service (QoS) of the extended reality (XR) service based on the at least one piece of QoS of an XR service. The first communication apparatus is a core network device or an access network device. The indication information is useable to indicate at least one piece of QoS of the XR service. The XR device receives data of the XR service or sends data of the XR service by a terminal device. The second communication apparatus is an XR server or a chip in the XR server.

20 Claims, 12 Drawing Sheets

(58) Field of Classification Search
USPC .................. 709/232, 233–235, 231, 230, 224
See application file for complete search history.

(56) References Cited

U.S. PATENT DOCUMENTS

2020/0084827 A1    3/2020  Atarius et al.
2022/0030459 A1*   1/2022  Seong .................... G06T 19/006

OTHER PUBLICATIONS

3GPP TS 22.261 V17.2.0 (Mar. 2020), 3rd Generation Partnership Project; Technical Specification Group Services and System Aspects; Service requirements for the 5G system; Stage 1(Release 17), 83 pages.

Ericsson, Proposed updates to solution #11 to align with AF session set up to request QoS. SA WG2 Meeting #S2-136, Nov. 18-22, 2019, Reno NV, USA, S2-1911122, 10 pages.

3GPP TR 26.928 V16.0.0 (Mar. 2020), 3rd Generation Partnership Project; Technical Specification Group Services and System Aspects; Extended Reality (XR) in 5G (Release 16), 131 pages.

Qualcomm Inc, Update of NCIS KPI requirements. 3GPP TSG-SA WG1 Meeting #88 , Reno, Nevada, US, Nov. 18-22, 2019, S1-193566, 2 pages.

Samsung, Discussion on notification of Alternative QoS profile. SA2 # 134, Sapporo, Japan, Jun. 24-28, 2019, S2-1907731, 6 pages.

Ericsson, ATandT, Qualcomm Inc, LG Electronics, Samsung, Nokia, Huawei, Fraunhofer HHI, Enhancements to QoS Handling for V2X Communication Over Uu Reference Point. 3GPP TSG SA WG2 Meeting #134, Sapporo, Japan, Jun. 24-28, 2019, S2-1908223, 5 pages.

International Search Report issued in corresponding International Application No. PCT/CN/2021/093455, dated Aug. 18, 2021, pp. 1-9.

Qualcomm Incorporated, Xiaomi, Tencent, Samsung, Updates to TR. TSG SA4#107 meeting, Jan. 20-24, 2020, Wroclaw, Poland, S4-200217, 20 pages.

* cited by examiner (a)

(b)

(a)

(b)

COMMUNICATION METHOD AND APPARATUS

CROSS-REFERENCE TO RELATED APPLICATIONS

This application is a continuation of International Application No. PCT/CN2021/093455, filed on May 12, 2021, which claims priority to Chinese Patent Application No. 202010470358.6, filed on May 28, 2020, the disclosures of the aforementioned applications are hereby incorporated by reference in their entireties.

TECHNICAL FIELD

This application relates to the field of communication technologies, and in particular, to a communication method and apparatus.

BACKGROUND

Extended reality (XR) refers to a reality and virtuality combined human-computer interactive environment generated by using a computer technology and a wearable device. XR is proposed based on augmented reality (AR), virtual reality (VR), and mixed reality (MR). In other words, to avoid concept confusion, XR is actually a general term, including AR, VR, and MR. An XR service aims to use a high-speed network and a technology, for example, 360-degree imaging, to achieve an interactive immersive experience effect.

Currently, there is little research on XR. For the XR service, how to select quality of service (QoS) is an urgent problem to be resolved.

SUMMARY

One or more embodiments of the present application provide a communication method and apparatus, to resolve a problem of selecting QoS of an XR service.

To achieve at least the foregoing objective, one or more embodiments of the present application provide the following technical solutions.

According to a first aspect, a communication method is provided. The method is applicable to a first communication apparatus. The first communication apparatus is a core network device or an access network device. The method includes: The first communication apparatus receives, from a second communication apparatus, indication information that is used to indicate at least one piece of QoS of an XR service, and determines first QoS of the XR service based on the at least one piece of QoS. An XR device receives data of the XR service and/or sends data of the XR service by using a terminal device. The second communication apparatus is an XR server or a chip in an XR server. According to the method provided in the first aspect, the first communication apparatus can receive, from the second communication apparatus, the indication information indicating the at least one piece of QoS, and determine the first QoS of the XR service from the at least one piece of QoS. The XR service can be subsequently performed by using the first QoS, to resolve a problem of how to select the QoS of the XR service.

In some embodiments, the indication information is further used to indicate an image processing parameter corresponding to the at least one piece of QoS. The image processing parameter includes one or more of the following: an image rendering manner and an image transmission manner. In this possible implementation, the first communication apparatus can determine the image processing parameter corresponding to the at least one piece of QoS.

In some embodiments, the method further includes: The first communication apparatus obtains an image processing capability of the terminal device. The image processing capability includes one or more of the following: an image rendering manner supported by the terminal device, an image transmission manner supported by the terminal device, and image processing preference of the terminal device. The image processing preference of the terminal device includes one or more of the following: an image rendering manner preferred by the terminal device, and an image transmission manner preferred by the terminal device. That the first communication apparatus determines first QoS of the XR service based on the at least one piece of QoS includes: The first communication apparatus determines the first QoS based on the at least one piece of QoS and the image processing capability. In this possible implementation, a method for determining the first QoS is provided.

In some embodiments, that the first communication apparatus obtains an image processing capability of the terminal device includes: The first communication apparatus receives the image processing capability from the terminal device. In this possible implementation, a method for obtaining the image processing capability of the terminal device by the first communication apparatus is provided.

In some embodiments, if the image processing capability does not include the image rendering manner supported by the terminal device, the terminal device does not support image rendering.

In some embodiments, the method further includes: The first communication apparatus sends the first QoS to the second communication apparatus. In this possible implementation, the first communication apparatus sends the first QoS to the second communication apparatus, so that the second communication apparatus determines the image processing parameter used when the second communication apparatus performs image data processing with the terminal device.

In some embodiments, the method further includes: When the QoS of the XR service changes from the first QoS to second QoS, the first communication apparatus sends the second QoS of the XR service to the second communication apparatus. In this possible implementation, when the QoS of the XR service changes, the first communication apparatus sends the second QoS to the second communication apparatus, so that the second communication apparatus updates the image processing parameter used when the second communication apparatus performs image data processing with the terminal device.

In some embodiments, the method further includes: The first communication apparatus obtains an updated image processing parameter from the second communication apparatus. The first communication apparatus updates the QoS of the XR service based on the updated image processing parameter. The image processing parameter includes one or more of the following: an image rendering manner and an image transmission manner. In this possible implementation, when the image processing parameter used when the second communication apparatus performs image data processing with the terminal device changes, the first communication apparatus receives the updated image processing parameter from the second communication apparatus, to update the QoS of the XR service.

In some embodiments, the image rendering manner includes local rendering, distributed rendering, and cloud rendering. The local rendering refers to a rendering manner in which the terminal device performs total rendering on an image. The distributed rendering refers to a rendering manner in which the terminal device performs partial rendering on an image. The cloud rendering refers to a rendering manner in which the second communication apparatus performs total rendering on an image.

In some embodiments, the image transmission manner includes field-of-view-based image transmission and non-field-of-view-based image transmission.

According to a second aspect, a communication method is provided. The method is applicable to a second communication apparatus. The second communication apparatus is an XR server or a chip in an XR server. The method includes: The second communication apparatus receives a request message that is used to request QoS of an XR service, and sends, to a first communication apparatus, indication information that is used to indicate at least one piece of QoS of the XR service. An XR device receives data of the XR service and/or sends data of the XR service by using a terminal device. The first communication apparatus is a core network device or an access network device. According to the method provided in the second aspect, the second communication apparatus can indicate the at least one piece of QoS to the first communication apparatus, so that the first communication apparatus determines first QoS of the XR service from the at least one piece of QoS. The XR service can be subsequently performed by using the first QoS, to resolve a problem of how to select the QoS of the XR service.

In some embodiments, the method further includes: The second communication apparatus receives an image processing capability of the terminal device from the terminal device. The image processing capability includes one or more of the following: an image rendering manner supported by the terminal device, an image transmission manner supported by the terminal device, and image processing preference of the terminal device. The image processing preference of the terminal device includes one or more of the following: an image rendering manner preferred by the terminal device, and an image transmission manner preferred by the terminal device. The second communication apparatus determines, based on the image processing capability, the at least one piece of QoS of the XR service and an image processing parameter corresponding to the at least one piece of QoS. The image processing parameter includes one or more of the following: an image rendering manner and an image transmission manner. In this possible implementation, a method for determining the at least one piece of QoS and the image processing parameter corresponding to the at least one piece of QoS by the second communication apparatus is provided.

In some embodiments, the indication information is further used to indicate the image processing parameter corresponding to the at least one piece of QoS. In this possible implementation, the first communication apparatus can determine the image processing parameter corresponding to the at least one piece of QoS.

In some embodiments, if the image processing capability does not include the image rendering manner supported by the terminal device, the terminal device does not support image rendering.

In some embodiments, the method further includes: The second communication apparatus receives, from the first communication apparatus, the first QoS determined for the XR service. The second communication apparatus determines, based on the first QoS, an image processing parameter corresponding to the first QoS. The second communication apparatus processes image data by using one or more image processing parameters corresponding to the first QoS. In this possible implementation, the first communication apparatus sends the first QoS to the second communication apparatus, and the second communication apparatus can determine, based on the first QoS, the image processing parameter used when the second communication apparatus performs image data processing with the terminal device.

In some embodiments, the method further includes: The second communication apparatus sends, to the terminal device, the one or more image processing parameters corresponding to the first QoS. In this possible implementation, the second communication apparatus sends, to the terminal device, the one or more image processing parameters corresponding to the first QoS, so that the terminal device obtains the image processing parameter used when the image data processing is performed.

In some embodiments, when the QoS of the XR service changes from the first QoS to second QoS, the method further includes: The second communication apparatus receives, from the first communication apparatus, the second QoS determined for the XR service. The second communication apparatus determines, based on the second QoS, whether to update the image processing parameter. If the second communication apparatus determines, based on the second QoS, to update the image processing parameter, the second communication apparatus determines, based on the second QoS, an image processing parameter corresponding to the second QoS. The second communication apparatus processes the image data by using one or more image processing parameters corresponding to the second QoS. In this possible implementation, when the QoS of the XR service changes, the first communication apparatus sends the second QoS to the second communication apparatus, and the second communication apparatus can update, based on the second QoS, the image processing parameter used when second communication apparatus performs image data processing with the terminal device.

In some embodiments, the method further includes: The second communication apparatus sends, to the terminal device, the one or more image processing parameters corresponding to the second QoS.

In some embodiments, the method further includes: The second communication apparatus updates the used image processing parameter. The second communication apparatus sends an updated image processing parameter to the first communication apparatus and the terminal device. In this possible implementation, when the image processing parameter used when the second communication apparatus performs image data processing with the terminal device changes, the second communication apparatus can send the updated image processing parameter to the first communication apparatus, so that the first communication apparatus updates the QoS of the XR service.

In some embodiments, the image rendering manner includes local rendering, distributed rendering, and cloud rendering. The local rendering refers to a rendering manner in which the terminal device performs total rendering on an image. The distributed rendering refers to a rendering manner in which the terminal device performs partial rendering on an image. The cloud rendering refers to a rendering manner in which the second communication apparatus performs total rendering on an image.

In some embodiments, the image transmission manner includes field-of-view-based image transmission and non-field-of-view-based image transmission.

According to a third aspect, a communication method is provided. The method includes: A terminal device reports an image processing capability of the terminal device to a second communication apparatus. The second communication apparatus is an XR server or a chip in an XR server. An XR device receives data of an XR service and/or sends data of an XR service by using the terminal device. The image processing capability includes one or more of the following: an image rendering manner supported by the terminal device, an image transmission manner supported by the terminal device, and image processing preference of the terminal device. The image processing preference of the terminal device includes one or more of the following: an image rendering manner preferred by the terminal device, and an image transmission manner preferred by the terminal device. The terminal device receives an image processing parameter from the second communication apparatus, and processes image data based on the received image processing parameter. The image processing parameter includes one or more of the following: an image rendering manner and an image transmission manner. According to the method provided in the third aspect, a method for obtaining the image processing capability of the terminal device by the second communication apparatus is provided.

In some embodiments, the image rendering manner includes local rendering, distributed rendering, and cloud rendering. The local rendering refers to a rendering manner in which the communication apparatus performs total rendering on an image. The distributed rendering refers to a rendering manner in which the communication apparatus performs partial rendering on an image. The cloud rendering refers to a rendering manner in which the second communication apparatus performs total rendering on an image.

In some embodiments, the image transmission manner includes field-of-view-based image transmission and non-field-of-view-based image transmission.

In some embodiments, if the image processing capability does not include the image rendering manner supported by the communication apparatus, the communication apparatus does not support image rendering.

According to a fourth aspect, a communication method is provided. The method includes: A terminal device reports an image processing capability of the terminal device to a first communication apparatus. The first communication apparatus is a core network device or an access network device. An XR device receives data of an XR service and/or sends data of an XR service by using the terminal device. The image processing capability includes one or more of the following: an image rendering manner supported by the terminal device, an image transmission manner supported by the terminal device, and image processing preference of the terminal device. The image processing preference of the terminal device includes one or more of the following: an image rendering manner preferred by the terminal device, and an image transmission manner preferred by the terminal device. According to the method provided in the fourth aspect, a method for obtaining the image processing capability of the terminal device by the first communication apparatus is provided.

In some embodiments, the image rendering manner includes local rendering, distributed rendering, and cloud rendering. The local rendering refers to a rendering manner in which the communication apparatus performs total rendering on an image. The distributed rendering refers to a rendering manner in which the communication apparatus performs partial rendering on an image. The cloud rendering refers to a rendering manner in which a second communication apparatus performs total rendering on an image.

In some embodiments, the image transmission manner includes field-of-view-based image transmission and non-field-of-view-based image transmission.

In some embodiments, if the image processing capability does not include the image rendering manner supported by the communication apparatus, the communication apparatus does not support image rendering.

According to a fifth aspect, a communication apparatus is provided. The communication apparatus includes one or more functional units. The one or more functional units are configured to perform the method according to the first aspect. For example, the communication apparatus includes a communication unit and a processing unit. The communication unit is configured to receive indication information from a second communication apparatus. The indication information is used to indicate at least one piece of QoS of an XR service. An XR device receives data of the XR service and/or sends data of the XR service by using a terminal device. The second communication apparatus is an XR server or a chip in an XR server. The processing unit is configured to determine first QoS of the XR service based on the at least one piece of QoS.

In some embodiments, the indication information is further used to indicate an image processing parameter corresponding to the at least one piece of QoS. The image processing parameter includes one or more of the following: an image rendering manner and an image transmission manner.

In some embodiments, the processing unit is further configured to obtain an image processing capability of the terminal device. The image processing capability includes one or more of the following: an image rendering manner supported by the terminal device, an image transmission manner supported by the terminal device, and image processing preference of the terminal device. The image processing preference of the terminal device includes one or more of the following: an image rendering manner preferred by the terminal device, and an image transmission manner preferred by the terminal device. The processing unit is specifically configured to determine the first QoS based on the at least one piece of QoS and the image processing capability.

In some embodiments, the processing unit is specifically configured to receive the image processing capability from the terminal device by using the communication unit.

In some embodiments, if the image processing capability does not include the image rendering manner supported by the terminal device, the terminal device does not support image rendering.

In some embodiments, the communication unit is further configured to send the first QoS to the second communication apparatus.

In some embodiments, when the QoS of the XR service changes from the first QoS to second QoS, the communication unit is further configured to send the second QoS of the XR service to the second communication apparatus.

In some embodiments, the communication unit is further configured to obtain an updated image processing parameter from the second communication apparatus. The processing unit is further configured to update the QoS of the XR service based on the updated image processing parameter.

The image processing parameter includes one or more of the following: an image rendering manner and an image transmission manner.

In some embodiments, the image rendering manner includes local rendering, distributed rendering, and cloud rendering. The local rendering refers to a rendering manner in which the terminal device performs total rendering on an image. The distributed rendering refers to a rendering manner in which the terminal device performs partial rendering on an image. The cloud rendering refers to a rendering manner in which the second communication apparatus performs total rendering on an image.

In some embodiments, the image transmission manner includes field-of-view-based image transmission and non-field-of-view-based image transmission.

In some embodiments, the communication apparatus is a core network device or an access network device.

According to a sixth aspect, a communication apparatus is provided. The communication apparatus includes one or more functional units. The one or more functional units are configured to perform the method according to the first aspect. For example, the communication apparatus includes a processing unit and a communication unit. The processing unit is configured to receive a request message by using the communication unit. The request message is used to request QoS of an XR service. An XR device receives data of the XR service and/or sends data of the XR service by using a terminal device. The processing unit is further configured to send indication information to a first communication apparatus by using the communication unit. The indication information is used to indicate at least one piece of QoS of the XR service. The first communication apparatus is a core network device or an access network device. In some embodiments, the processing unit is further configured to receive an image processing capability of the terminal device from the terminal device by using the communication unit. The image processing capability includes one or more of the following: an image rendering manner supported by the terminal device, an image transmission manner supported by the terminal device, and image processing preference of the terminal device. The image processing preference of the terminal device includes one or more of the following: an image rendering manner preferred by the terminal device, and an image transmission manner preferred by the terminal device. The processing unit is further configured to determine, based on the image processing capability, the at least one piece of QoS of the XR service and an image processing parameter corresponding to the at least one piece of QoS. The image processing parameter includes one or more of the following: an image rendering manner and an image transmission manner.

In some embodiments, the indication information is further used to indicate the image processing parameter corresponding to the at least one piece of QoS.

In some embodiments, if the image processing capability does not include the image rendering manner supported by the terminal device, the terminal device does not support image rendering.

In some embodiments, the processing unit is further configured to receive, from the first communication apparatus by using the communication unit, first QoS determined for the XR service. The processing unit is further configured to determine, based on the first QoS, an image processing parameter corresponding to the first QoS, and process image data by using one or more image processing parameters corresponding to the first QoS.

In some embodiments, the processing unit is further configured to send, to the terminal device by using the communication unit, the one or more image processing parameters corresponding to the first QoS.

In some embodiments, when the QoS of the XR service changes from the first QoS to second QoS, the processing unit is further configured to receive, from the first communication apparatus by using the communication unit, the second QoS determined for the XR service. The processing unit is further configured to determine, based on the second QoS, whether to update the image processing parameter. If it is determined to update the image processing parameter, the processing unit is further configured to determine, based on the second QoS, an image processing parameter corresponding to the second QoS, and process the image data by using one or more image processing parameters corresponding to the second QoS.

In some embodiments, the processing unit is further configured to send, to the terminal device by using the communication unit, the one or more image processing parameters corresponding to the second QoS.

In some embodiments, the processing unit is further configured to update the used image processing parameter, and send an updated image processing parameter to the first communication apparatus and the terminal device by using the communication unit.

In some embodiments, the image rendering manner includes local rendering, distributed rendering, and cloud rendering. The local rendering refers to a rendering manner in which the terminal device performs total rendering on an image. The distributed rendering refers to a rendering manner in which the terminal device performs partial rendering on an image. The cloud rendering refers to a rendering manner in which the communication apparatus performs total rendering on an image.

In some embodiments, the image transmission manner includes field-of-view-based image transmission and non-field-of-view-based image transmission.

In some embodiments, the communication apparatus is an XR server or a chip in an XR server.

According to a seventh aspect, a communication apparatus is provided. The communication apparatus includes one or more functional units. The one or more functional units are configured to perform the method according to the first aspect. For example, the communication apparatus includes a processing unit and a communication unit. The communication unit is configured to report an image processing capability of the communication apparatus to a second communication apparatus. The second communication apparatus is an XR server or a chip in an XR server. An XR device receives data of an XR service and/or sends data of an XR service by using the communication apparatus. The image processing capability includes one or more of the following: an image rendering manner supported by the communication apparatus, an image transmission manner supported by the communication apparatus, and image processing preference of the communication apparatus. The image processing preference of the communication apparatus includes one or more of the following: an image rendering manner preferred by the communication apparatus, and an image transmission manner preferred by the communication apparatus. The communication unit is further configured to receive an image processing parameter from the second communication apparatus. The processing unit is configured to process image data based on the received image processing parameter. The image processing parameter includes one or more of the following: an image rendering manner and an image transmission manner.

In some embodiments, the image rendering manner includes local rendering, distributed rendering, and cloud rendering. The local rendering refers to a rendering manner in which the communication apparatus performs total rendering on an image. The distributed rendering refers to a rendering manner in which the communication apparatus performs partial rendering on an image. The cloud rendering refers to a rendering manner in which the second communication apparatus performs total rendering on an image.

In some embodiments, the image transmission manner includes field-of-view-based image transmission and non-field-of-view-based image transmission.

In some embodiments, if the image processing capability does not include the image rendering manner supported by the communication apparatus, the communication apparatus does not support image rendering.

According to an eighth aspect, a communication apparatus is provided. The communication apparatus includes one or more functional units. The one or more functional units are configured to perform the method according to the first aspect. For example, the communication apparatus includes a processing unit and a communication unit. The processing unit is configured to report an image processing capability of the communication apparatus to a first communication apparatus by using the communication unit. The first communication apparatus is a core network device or an access network device. An XR device receives data of an XR service and/or sends data of an XR service by using the communication apparatus. The image processing capability includes one or more of the following: an image rendering manner supported by the communication apparatus, an image transmission manner supported by the communication apparatus, and image processing preference of the communication apparatus. The image processing preference of the communication apparatus includes one or more of the following: an image rendering manner preferred by the communication apparatus, and an image transmission manner preferred by the communication apparatus.

In some embodiments, the image rendering manner includes local rendering, distributed rendering, and cloud rendering. The local rendering refers to a rendering manner in which the communication apparatus performs total rendering on an image. The distributed rendering refers to a rendering manner in which the communication apparatus performs partial rendering on an image. The cloud rendering refers to a rendering manner in which a second communication apparatus performs total rendering on an image.

In some embodiments, the image transmission manner includes field-of-view-based image transmission and non-field-of-view-based image transmission.

In some embodiments, if the image processing capability does not include the image rendering manner supported by the communication apparatus, the communication apparatus does not support image rendering.

According to a ninth aspect, a communication apparatus is provided. The communication apparatus includes a processor. The processor is connected to a memory. The memory is configured to store computer-executable instructions. The processor executes the computer-executable instructions stored in the memory, to implement any method according to any one of the first aspect to the fourth aspect. For example, the memory and the processor may be integrated together, or may be independent components. If the memory and the processor are independent components, the memory may be located inside the communication apparatus, or may be located outside the communication apparatus.

In some embodiments, the processor includes a logic circuit, and further includes at least one of an input interface and an output interface. For example, the output interface is configured to perform a sending action in a corresponding method, and the input interface is configured to perform a receiving action in a corresponding method.

In some embodiments, the communication apparatus further includes a communication interface and a communication bus. The processor, the memory, and the communication interface are connected through the communication bus. The communication interface is configured to perform receiving and sending actions in a corresponding method. The communication interface may also be referred to as a transceiver. In some embodiments, the communication interface includes at least one of a transmitter and a receiver. In this case, the transmitter is configured to perform a sending action in a corresponding method, and the receiver is configured to perform a receiving action in a corresponding method.

In some embodiments, the communication apparatus exists in a product form of a chip.

According to a tenth aspect, a communication apparatus is provided. The communication apparatus includes a processor and an interface. The processor is coupled to a memory through the interface. When the processor executes a computer program or computer-executable instructions in the memory, any method according to any one of the first aspect to the fourth aspect is performed.

According to an eleventh aspect, a computer-readable storage medium is provided, including computer-executable instructions. When the computer-executable instructions are run on a computer, the computer is enabled to perform any method according to any one of the first aspect to the fourth aspect.

According to a twelfth aspect, a computer program product is provided, including computer-executable instructions. When the computer-executable instructions are run on a computer, the computer is enabled to perform any method according to any one of the first aspect to the fourth aspect.

According to a thirteenth aspect, a communication system is provided, including one or more of the communication apparatuses according to the fifth aspect to the eighth aspect.

According to a fourteenth aspect, a communication apparatus is provided, configured to perform any method according to any one of the first aspect to the fourth aspect.

For a technical effect brought by any implementation of the fifth aspect to the fourteenth aspect, refer to a technical effect brought by a corresponding implementation of the first aspect to the fourth aspect. Details are not described herein again.

It should be noted that, on the premise that the solutions are not contradictory, the solutions in the foregoing aspects may be combined.

DETAILED DESCRIPTION

In descriptions of this application, "I" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In the descriptions of this application, "a plurality of" means two or more than two unless otherwise specified. "At least one" means any one or any combination of more than one, and "at least one" means any one or any combination of more than one. For example, at least one of A, B, and C may include the following cases: 1. A; 2. B; 3. C; 4. A and B; 5. A and C; 6. B and C; 7. A, B, and C.

In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

This application may be applied to a 4th generation (4G) system, various systems evolved based on the 4G system, a 5th generation (5G) system, and various systems evolved based on the 5G system. The 4G system may also be referred to as an evolved packet system (EPS). In the 4G system, a core network may be referred to as an evolved packet core (EPC), and an access network may be referred to as long term evolution (LTE). In the 5G system, a core network may be referred to as a 5G core (5GC), and an access network may be referred to as new radio (NR). For ease of description, this application is described below by using an example in which this application is applied to the 5G system. However, it may be understood that this application is also applicable to the 4G system, a 3rd generation (3G) system, and the like. This is not limited.

Figure 1:
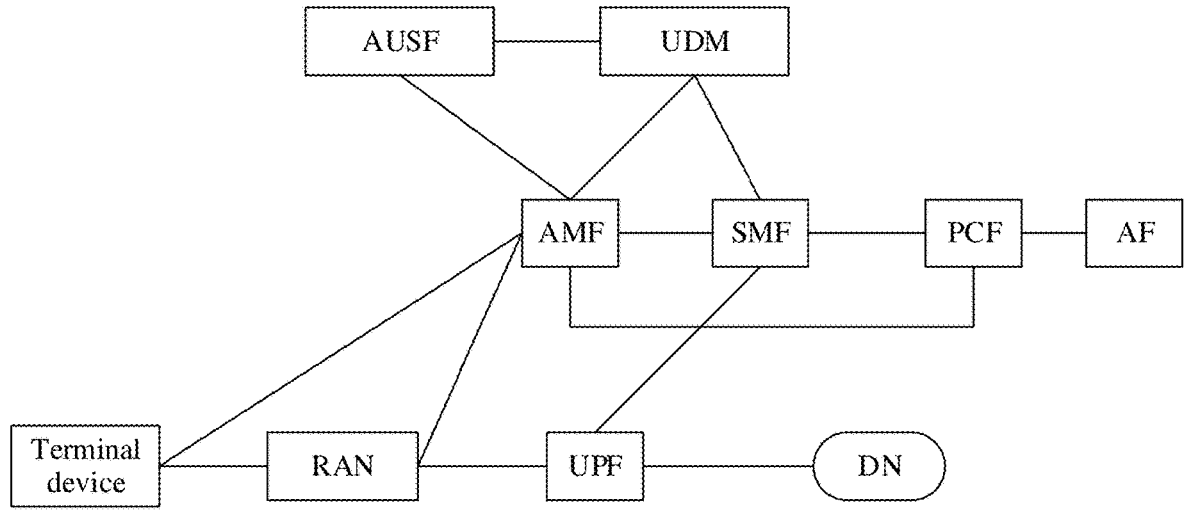
FIG. 1 is a schematic diagram of an architecture of a 5G system according to at least an embodiment of this application.

FIG. 1 shows an example of a schematic diagram of a network architecture of a 5G system. In this schematic diagram, the 5G system may include an authentication server function (AUSF) network element, an access and mobility management function (AMF) network element, a data network (data network, DN), a unified data management (UDM) network element, a policy control function (PCF) network element, a radio access network (RAN) network element, a user plane function (user plane function, UPF) network element, a terminal device (terminal), an application function (AF) network element, and a session management function (SMF) network element.

It should be noted that the RAN network element, the AMF network element, the SMF network element, the AUSF network element, the UDM network element, the UPF network element, the PCF network element, and the like in FIG. 1 are merely names, and the names constitute no limitation on the network elements. In a 5G network and another future network, entities or devices corresponding to these network elements may have other names. This is not specifically limited in this embodiment of this application. For example, the UDM network element may alternatively be replaced with a home subscriber server (HSS), a user subscription database (USD), a database network element, or the like. A general description is provided herein, and details are not described below again.

For ease of description, the RAN network element, the AMF network element, the SMF network element, the UDM network element, the UPF network element, the PCF network element, and the like are respectively represented by using RAN, AMF, SMF, UDM, UPF, a PCF, and the like in the following.

FIG. 1 shows an interaction relationship and a corresponding interface between network elements. For example, the terminal device and the AMF may interact with each other through an interface N1, and an interaction message is referred to as a message N1. Some interfaces are implemented as service-oriented interfaces.

Functions of some network elements in FIG. 1 are as follows.

The PCF has a function of providing a policy rule and the like for a control plane network element.

The UDM has functions such as user subscription data management and generation of user certification information.

The AF may be an application server, and may belong to an operator or a third party. The AF mainly supports interaction with a 3rd generation partnership project (3GPP) core network to provide a service, for example, affect a data routing decision and a policy control function or provide some third-party services to a network side.

The AMF may also be referred to as an access management device, and is mainly responsible for functions of a signaling processing part, for example, terminal device registration management, terminal device connection management, terminal device reachability management, terminal device access authorization and access authentication, a terminal device security function, terminal device mobility management, network slice (network slice) selection, SMF selection, and terminal device attach and detach. The AMF serves as an anchor point of connection between signaling N1 and signaling N2, provides routing of an N1/N2 interface session management (SM) message for the SMF, and maintains and manages status information of the terminal device. When serving a session in the terminal device, the AMF network element provides a control plane storage resource for the session, to store a session context, for example, a session identifier and an identifier of an SMF associated with the session identifier.

The SMF is mainly responsible for all control plane functions of session management of the terminal device, including UPF selection, control, and redirection, Internet Protocol (IP) address allocation and management, session QoS management, and obtaining a policy and charging control (PCC) policy from the PCF, bearer establishment, modification, and release, QoS control, and the like. The SMF also serves as a termination of an SM part in a non-access stratum (NAS) message.

The UPF serves as an anchor point of a protocol data unit (PDU) session connection, and is responsible for data packet filtering and data transmission/forwarding (for example, receiving data from a DN and transmitting the data to the terminal device by using an access network device, or receiving data from a terminal device by using an access network device and sending the data to a DN) of the terminal device, rate control, charging information generation, user-plane QoS processing, uplink transmission certification, transmission class verification, downlink data packet buffering, and downlink data notification triggering, and the like. The UPF may also serve as a branching point of a multi-homed (multi-homed) PDU session. A resource transmission and scheduling function that is used by the UPF to provide a service for the terminal device is managed and controlled by the SMF.

The RAN (which may also be referred to as a next generation radio access network (NG-RAN)) is a network including a plurality of access network devices (which may also be referred to as access network network elements, network devices, or RAN nodes), and implements functions such as a radio physical layer function, resource scheduling and radio resource management, radio access control and mobility management functions, quality of service management, and data compression and encryption. The access network device in embodiments of this application refers to a radio access network device. The access network device is connected to the UPF through a user plane interface N3, and is configured to transmit data of the terminal device. The access network device establishes a control plane signaling connection to the AMF through a control plane interface N2, to implement functions such as radio access bearer control. The access network device is an access device that is used by a terminal device to access a mobile communication system in a wireless manner, and may be a base station (base station), an evolved NodeB (eNodeB), a transmission reception point (TRP), a next generation NodeB (gNB), a base station in a future mobile communication system, an access node in a wireless fidelity (Wi-Fi) system, or the like. The access network device in this application may be a complete entity, or may be in a form in which a central unit (CU) and a distributed unit (DU) are separated. A plurality of DUs may be all controlled by one CU. Logical functions of the CU and the DU may be deployed on a single physical entity, or may be deployed on different physical entities.

The terminal device may be a wireless terminal device or a wired terminal device. The wireless terminal device may refer to a device that provides a user with voice and/or data connectivity, a handheld device with a wireless connection function, or another processing device connected to a wireless modem. The terminal device and the access network device communicate with each other by using an air interface technology (for example, an NR technology or an LTE technology). Alternatively, the terminal device and the terminal device may communicate with each other by using an air interface technology (for example, an NR technology or an LTE technology). The wireless terminal device may communicate with one or more core network devices by using an access network device, for example, communicate with an AMF, an SMF, or the like. The terminal device may be a mobile terminal device, such as a mobile phone (or referred to as a "cellular" phone), a smartphone, a satellite wireless device, a wireless terminal device in industrial control, a wireless terminal device in unmanned driving, a wireless terminal device in remote surgery, a wireless terminal device in a smart grid, a wireless terminal device in transportation security, a wireless terminal device in a smart city (smart city), a wireless terminal device in a smart home, a wireless modem card, and a computer having a mobile terminal device (for example, which may be a laptop, portable, pocket-sized, handheld, computer built-in, or vehicle-mounted mobile apparatus). They exchange voice and/or data with the access network device. For example, the wireless terminal device may be a device, for example, a personal communication service (PCS) phone, a mobile phone, a tablet computer, a computer with a wireless transceiver function, an AR terminal device, a VR terminal device, an MR terminal device, an XR terminal device, a cordless telephone set, or a session initiation protocol (SIP) phone, a wireless local loop (WLL) station, a personal digital assistant (PDA), or a machine type communication terminal device. In Internet of Vehicles communication, a communication device mounted on a vehicle is a terminal device, and a road side unit (RSU) may also be used as a terminal device. A communication device mounted on an uncrewed aerial vehicle may also be considered as a terminal device. The terminal device may also be referred to as user equipment (UE), a terminal, a mobile terminal (MT), a subscriber unit (subscriber unit), a subscriber station, a mobile station, a remote station, an access point, an access terminal, a user terminal, a user agent, or the like.

It may be understood that, in addition to the functional network elements shown in FIG. 1, the network architecture of the 5G network may further include another functional network element. In embodiments of this application, the network element may also be referred to as an entity, a device, or the like.

The terminal device, the RAN, the UPF, and the DN in FIG. 1 are generally referred to as user plane network elements. Data traffic of a user may be transmitted by using a PDU session established between the terminal device and the DN, and the transmission passes through the two network elements: the RAN and the UPF. A user plane is used to carry service data. Another network element in FIG. 1 is referred to as a control plane network element, and is mainly responsible for functions such as certification and authentication, registration management, session management, mobility management, and policy control, to implement reliable and stable transmission of user-layer traffic. A control plane is used to carry a signaling message.

Figure 2:
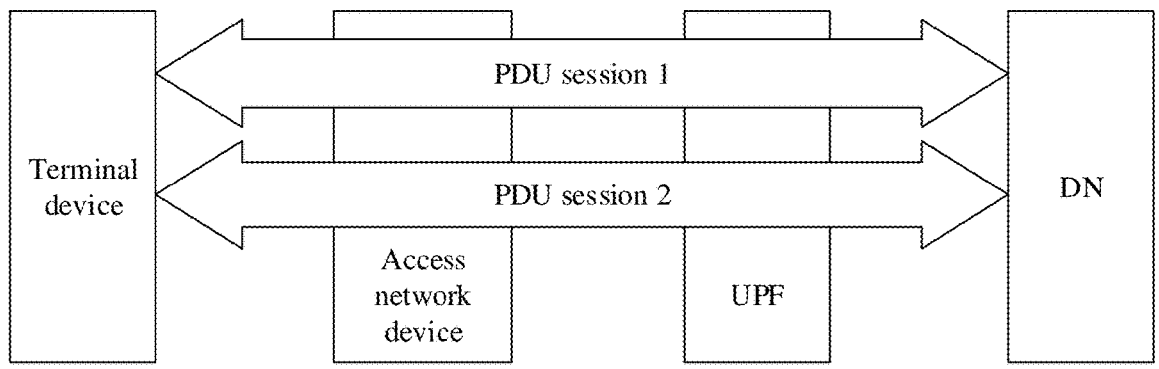
FIG. 2 is a schematic diagram of a PDU session according to at least an embodiment of this application.

As shown in FIG. 2, a PDU session is a connection between a terminal device and a DN, and is used to provide a PDU connection service. A type of the PDU session may be an IP connection, an Ethernet connection, an unstructured data connection, or the like. A PDU connection service supported by the core network in the 5G system refers to a service that provides PDU exchange between a terminal device and a DN determined by a data network name (DNN). The terminal device may initiate establishment of one or more PDU sessions, to connect to a same DN or different DNs. For example, in FIG. 2, the terminal device initiates establishment of a PDU session 1 and a PDU session 2, to connect to a same DN.

Figure 3:
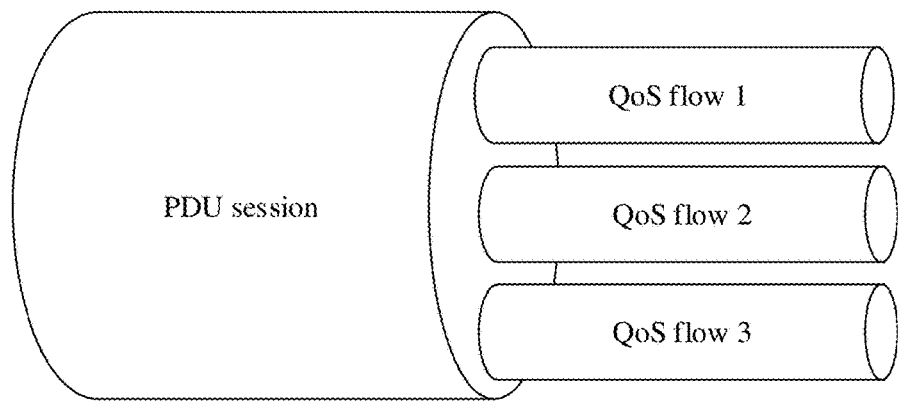
FIG. 3 is a schematic diagram of a relationship between a PDU session and a QoS flow according to at least an embodiment of this application.

A QoS flow (flow) is a finest QoS differentiation granularity in a PDU session, and one QoS flow identifier (QFI) is used to identify one QoS flow. One PDU session may include a plurality of QoS flows, and each QoS flow may carry a plurality of services. For example, as shown in FIG. 3, one PDU session includes three QoS flows: a QoS flow 1, a QoS flow 2, and a QoS flow 3. In one QoS flow, different services have same QoS.

The method provided in embodiments of this application may be applied to AR, VR, MR, and XR. An AR technology is a technology that cleverly integrates virtual information with the real world. A plurality of technical means such as multimedia, three-dimensional modeling, real-time tracking and registration, intelligent interaction, and sensing are widely used to simulate virtual information such as a text, an image, a three-dimensional model, music, and a video that are generated by a computer. Then, simulated information is applied to the real world, and the two types of information complement each other, to implement "augmentation" of the real world. A VR technology is also called a virtual reality technology. The VR technology integrates a computer, electronic information, and a simulation technology. A basic implementation of the VR technology is that the computer simulates a virtual environment to give environment immersive experience for a person. A virtual scene created by using an MR technology can enter a real life and know a user. For example, by using a device of the user, the user can measure a scale and an orientation of an object in real life when seeing a scene in eyes. A biggest feature of the MR technology is that a virtual world and the real world can interact with each other. For description of an XR technology, refer to the background. Details are not described again. For ease of description, the method provided in embodiments of this application is described below in this application by using an example in which the provided method is applied to an XR service. When the method is applied to the AR, the VR, or the MR, corresponding information or architecture is replaced with information and architecture in the AR, the VR, or the MR for understanding. For example, when the method is applied to the VR, an XR device in the following may be replaced with a VR device.

Figure 4:
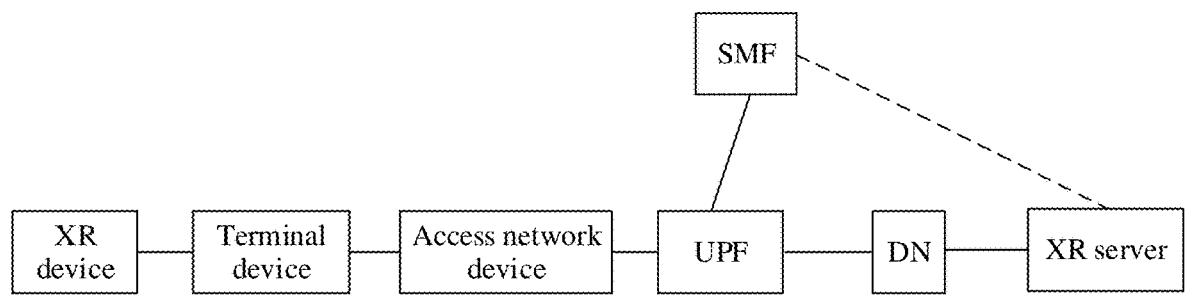
FIG. 4 is a schematic diagram of communication between an XR device and an XR server according to at least an embodiment of this application.
Figure 4:
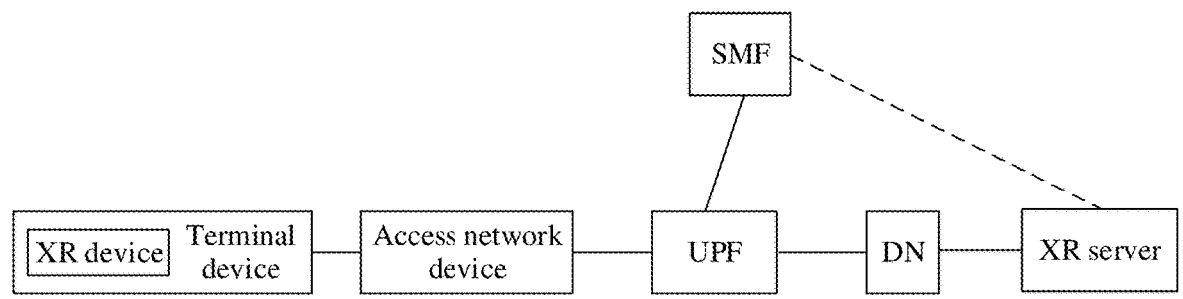

In the XR service, the XR device (which may also be referred to as an XR client (XR Device)) may communicate with an XR server by using a terminal device, an access network device, a UPF, and a DN. The XR device may be located outside the terminal device (refer to (a) in FIG. 4, the terminal device may be connected to a plurality of XR devices, and only one XR device is shown in the figure), and is connected to the terminal device in a wired or wireless manner (for example, Wi-Fi or another wireless manner). Alternatively, the XR device may be integrated inside the terminal device (refer to (b) in FIG. 4, the terminal device may have a plurality of XR devices, and only one XR device is shown in the figure). This is not limited in this application. The XR server may be located outside the DN, and is connected to the SMF by using the control plane. It should be noted that the XR device is also a terminal device. To distinguish from the terminal device that accesses the access network device, the terminal device is referred to as the XR device in this application. The XR device may include one or more of a display (or a screen or a display device), a sensor, a speaker, and the like. For example, the XR device may be an XR helmet.

When the XR service is performed, the sensor in the XR device captures an action of a user, and displays a corresponding picture. There may be the following several architectures for communication between the XR device and the XR server (an XR architecture for short below).

XR Architecture 1

Figure 5:
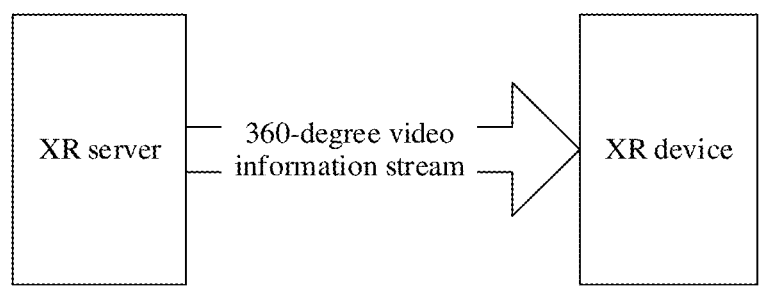
FIG. 5 is a schematic diagram of an XR architecture according to at least an embodiment of this application.

As shown in FIG. 5, in the XR architecture 1, the XR server (XR Server) always transmits a 360-degree video information stream to the XR device. The XR device selects and displays a part of a received video stream based on a line-of-sight change that is of the user and that is detected by the sensor. This XR architecture always needs to transmit the 360-degree video information stream in real time. Therefore, a rate of approximately 100 Mbps is needed. Mbps refers to megabits per second.

XR Architecture 2

Figure 6:
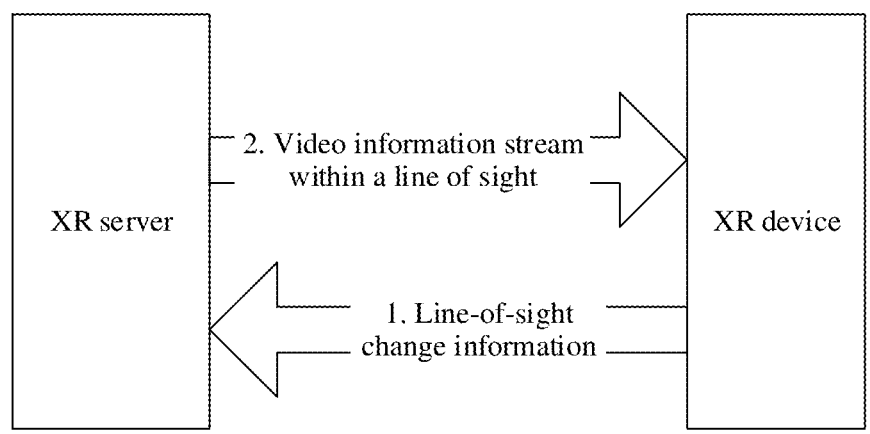
FIG. 6 is a schematic diagram of another XR architecture according to at least an embodiment of this application.
Figure 7:
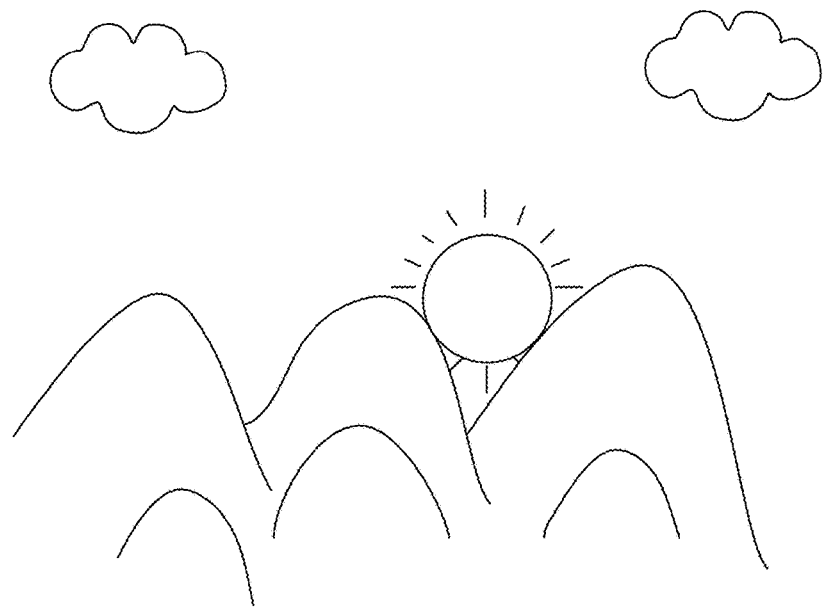
FIG. 7 is a schematic diagram of a picture displayed by an XR device according to at least an embodiment of this application.
Figure 7:
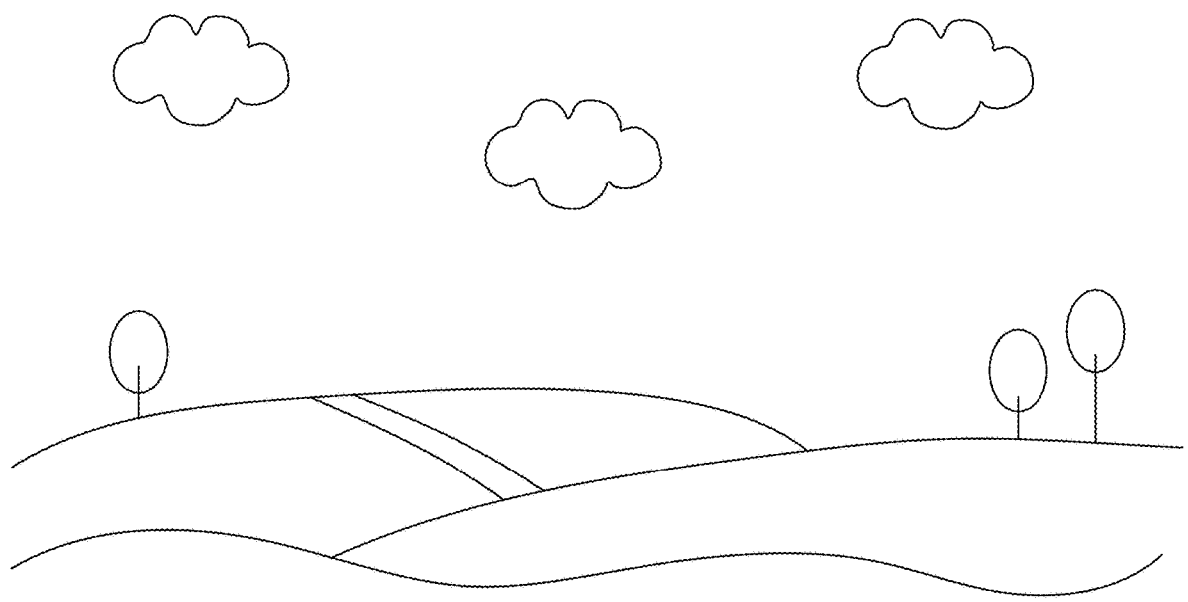

As shown in FIG. 6, in the XR architecture 2, the sensor in the XR device detects a line-of-sight change of the user, and transmits line-of-sight change information of the user to the XR server. The XR server determines a line of sight of the user based on the line-of-sight change information of the user, and transmits a video information stream within the line of sight to the XR device. For example, as shown in FIG. 7, the XR service simulates a sunrise scene. When eyes of the user turn to the east, the XR server transmits a picture of a sun rise in the east, and the XR device displays the picture of the sun rise in the east (refer to (a) in FIG. 7). When the eyes of the user turn to the west, the XR server transmits a picture of a morning in the west, and the XR device displays the picture of the morning in the west (refer to (b) in FIG. 7). This image transmission manner in which only image data within a line of sight is transmitted is referred to as field-of-view-based image transmission (Field of view, Fov), and needs a rate of approximately 25 Mbps.

XR Architecture 3

Figure 8:
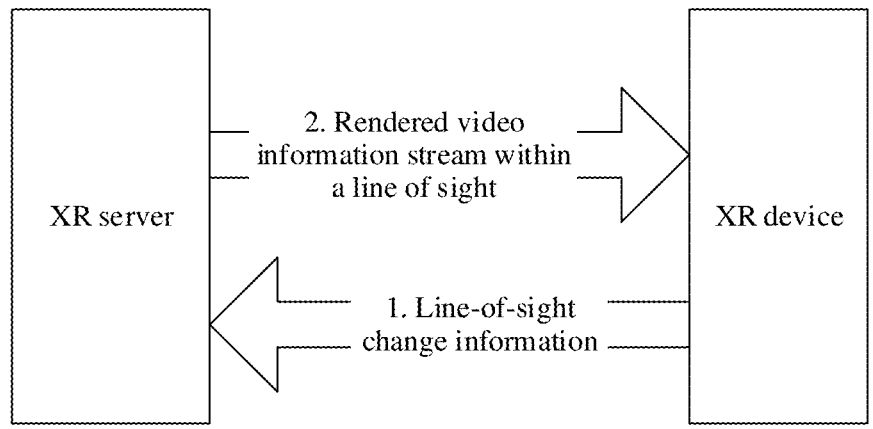
FIG. 8 is a schematic diagram of still another XR architecture according to at least an embodiment of this application.

As shown in FIG. 8, in the XR architecture 3, the sensor in the XR device detects a line-of-sight change of the user, and transmits line-of-sight change information of the user to the XR server. The XR server determines a line of sight of the user based on the line-of-sight change information of the user, determines whether there is an object that needs to be rendered in the line of sight, performs rendering if there is an object that needs to be rendered, and then transmits a video information stream in the line of sight to the XR device. Due to rendering, a data volume increases greatly. Currently, a rate of 100 Mbps, 1 Gbps, or 10 Gbps may be needed. The XR architecture 3 is also an XR architecture of Fov.

In the foregoing several XR architectures, an image transmission manner of the XR architecture 1 is non-field-of-view-based image transmission (non-Fov for short) Image transmission manners of the XR architecture 2 and the XR architecture 3 are Fov. The XR architecture 1 and the XR architecture 2 do not need to perform image rendering. The XR architecture 3 needs to perform image rendering. To achieve same experience (for example, same image quality and a same data transmission delay), QoS (for example, a rate) requirements needed by different image processing parameters (an image transmission manner and/or an image rendering manner) differ greatly.

Currently, there is little research on XR. For an XR service, how to select QoS is an urgent problem to be resolved. In addition, there is no corresponding solution to how to select an image processing parameter. To resolve these problems, this application provides a communication method. Selection of the QoS and selection of the image processing parameter are performed by using one or more of the QoS of the XR service, an image processing capability of a terminal device, and air interface load.

Figure 9:
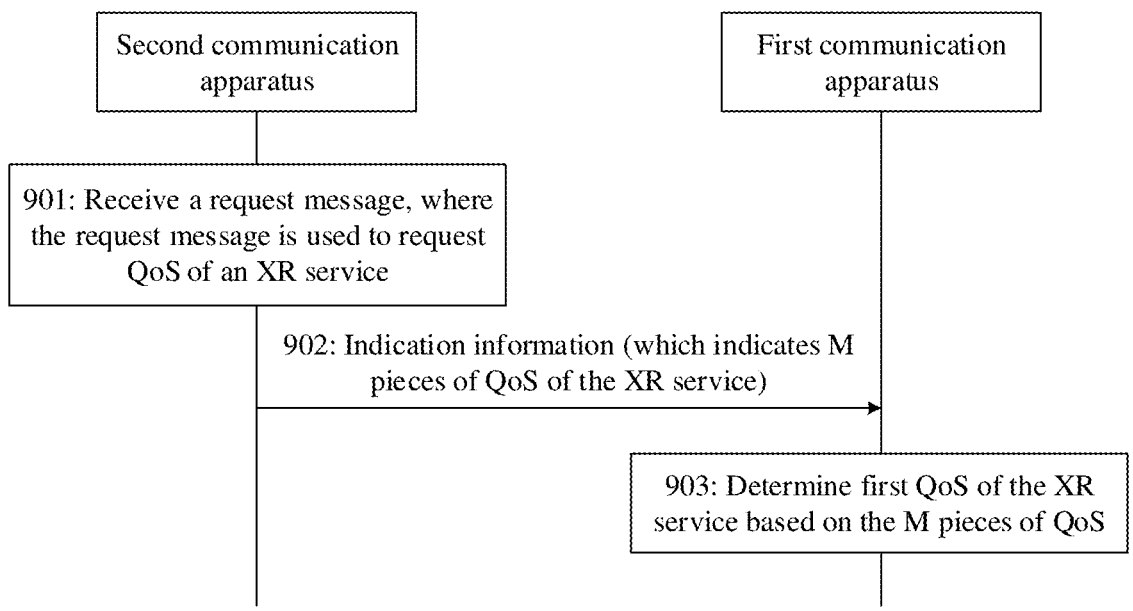
FIG. 9 is an interactive flowchart of a communication method according to at least an embodiment of this application.

As shown in FIG. 9, the method includes the following steps.

901: A second communication apparatus receives a request message, where the request message is used to request the QoS of the XR service.

The second communication apparatus is an XR server or a chip in an XR server. The second communication apparatus may receive the request message from an SMF. The request message sent by the SMF may be generated by the SMF, or may be received from the terminal device. This is not limited in this application.

The XR service may be an XR game, XR navigation, or the like. An XR device receives data of the XR service and/or sends data of the XR service by using the terminal device. The XR device may be located outside the terminal device (refer to (a) in FIG. 4) and is connected to the terminal device in a wired or wireless manner, or may be integrated inside the terminal device (refer to (b) in FIG. 4).

902: The second communication apparatus sends indication information to a first communication apparatus. The indication information is used to indicate at least one piece of QoS (which is denoted as M pieces of QoS, where M is a positive integer) of the XR service. Correspondingly, the first communication apparatus receives the indication information from the second communication apparatus.

The first communication apparatus is a core network device (for example, an AMF) or an access network device.

During specific implementation of Step 902, the second communication apparatus may send the M pieces of QoS of the XR service to the SMF, and the SMF sends the M pieces of QoS to the first communication apparatus. When the first communication apparatus is an AMF, the second communication apparatus may send the M pieces of QoS of the XR service to the AMF by using the SMF. When the first communication apparatus is an access network device, the second communication apparatus may send the M pieces of QoS of the XR service to the access network device by sequentially using the SMF and the AMF. One piece of QoS may include a plurality of parameters, for example, one or more of a rate, a delay budget, a data packet error rate, and a maximum data volume of a data burst (burst).

During specific implementation of Step 902, the indication information may indicate identifiers of the M pieces of QoS. For example, the second communication apparatus may send a QoS list to the first communication apparatus, and the QoS list includes the identifiers of the M pieces of QoS of the XR service.

903: The first communication apparatus determines first QoS of the XR service based on the M pieces of QoS.

According to the method provided in this embodiment of this application, the first communication apparatus can receive, from the second communication apparatus, the indication information indicating the M pieces of QoS, and determine the first QoS of the XR service from the M pieces of QoS. The XR service can be subsequently performed by using the first QoS. This application provides a method for selecting the QoS of the XR service, to resolve a problem of how to select the QoS of the XR service.

In some embodiments, the method further includes the following Step 11 and/or Step 12.

Step 11: The second communication apparatus obtains the image processing capability of the terminal device. Specifically, the terminal device reports the image processing capability of the terminal device to the second communication apparatus. Correspondingly, the second communication apparatus receives the image processing capability of the terminal device from the terminal device.

Step 12: The first communication apparatus obtains the image processing capability of the terminal device. Specifically, in one case, the terminal device reports the image processing capability of the terminal device to the first communication apparatus. Correspondingly, the first communication apparatus receives the image processing capability of the terminal device from the terminal device. In another case, the first communication apparatus obtains the image processing capability of the terminal device from an operation administration and maintenance (OAM) or another database.

The image processing capability of the terminal device includes one or more of the following: an image rendering manner supported by the terminal device, an image transmission manner supported by the terminal device, and image processing preference of the terminal device. The image processing preference of the terminal device includes one or more of the following: an image rendering manner preferred by the terminal device, and an image transmission manner preferred by the terminal device.

The "image processing preference of the terminal device" may be classified as capability information of the terminal device, or may be classified as other information of the terminal device. This is not limited. In this application, the "image processing preference of the terminal device" is considered as the capability information. However, regardless of whether the information is considered as the capability information of the terminal device, a function of the information is unchanged.

In this embodiment of this application, the image rendering manner includes local rendering, distributed rendering, and cloud rendering. The local rendering refers to a rendering manner in which the terminal device performs total rendering on an image. The distributed rendering refers to a rendering manner in which the terminal device performs partial rendering on an image (where another part of rendering is performed by the second communication apparatus). The cloud rendering refers to a rendering manner in which the second communication apparatus performs total rendering on an image.

When the distributed rendering is used, the terminal device and the second communication apparatus may perform rendering at the same time (in this case, the distributed rendering may alternatively be referred to as parallel rendering), or may perform rendering at different times. This is not limited in this application.

It may be understood that, if the cloud rendering is used to perform image rendering, data sent by the second communication apparatus to the terminal device is image data obtained after the second communication apparatus performs total rendering, and a data volume is large. If the distributed rendering is used, data sent by the second communication apparatus to the terminal device is image data obtained after the second communication apparatus performs partial rendering. Compared with the cloud rendering, a data volume is reduced. If the local rendering is used, data sent by the second communication apparatus to the terminal device is image data that is not rendered by the second communication apparatus. Compared with the distributed rendering, a data volume is smaller.

In this embodiment of this application, the image transmission manner includes Fov and non-Fov. Fov refers to an image transmission manner of transmitting only image data within a line of sight (for example, the transmission manners in the foregoing architecture 2 and architecture 3), and non-Fov refers to an image transmission manner of transmitting both image data within a line of sight and image data outside the line of sight (for example, the transmission manner in the foregoing architecture 1).

The image rendering manner supported by the terminal device may include local rendering and/or distributed rendering. The terminal device may indicate a supported image rendering manner by indicating whether the local rendering is supported and whether the distributed rendering is supported. In some embodiments, if the image processing capability of the terminal device does not include the image rendering manner supported by the terminal device, the terminal device does not support image rendering.

The image transmission manner supported by the terminal device includes Fov and/or non-Fov. The image rendering manner preferred by the terminal device may be local rendering or distributed rendering. The image transmission manner preferred by the terminal device may be Fov or non-Fov. The image processing preference of the terminal device may be for same experience (for example, same image quality and a same data transmission delay), that is, to achieve the same experience. If the terminal device supports two image rendering manners and/or two image transmission manners, the image processing preference of the terminal device includes an image rendering manner and/or an image transmission manner that the terminal device prefers.

In some embodiments, the method further includes the following Step 21 and/or Step 22.

Step 21: The second communication apparatus obtains the air interface load. Specifically, the access network device sends the air interface load to the second communication apparatus. Correspondingly, the second communication apparatus receives the air interface load from the access network device. The second communication apparatus may receive the air interface load from the access network device by sequentially using the AMF and the SMF.

Step 22: The first communication apparatus obtains the air interface load, where the first communication apparatus is the AMF. Specifically, the access network device sends the air interface load to the AMF. Correspondingly, the AMF receives the air interface load from the access network device.

A case in which the second communication apparatus obtains the image processing capability of the terminal device and obtains the air interface load is denoted as Case 1. A case in which the second communication apparatus obtains only the image processing capability of the terminal device is denoted as Case 2. A case in which the second communication apparatus obtains neither the image processing capability of the terminal device nor the air interface load is denoted as Case 3. The following specifically describes the method provided in this application in Case 1 to Case 3.

Case 1: The second communication apparatus obtains the image processing capability of the terminal device and obtains the air interface load.

In Case 1, in some embodiments, before Step 902, the foregoing method further includes the following step.

Step 31: The second communication apparatus determines the M pieces of QoS based on the image processing capability of the terminal device and the air interface load.

Further, during specific implementation, Step 31 may include: The second communication apparatus determines the M pieces of QoS based on the image processing capability of the terminal device, the air interface load, and a display capability of the XR device. The display capability of the XR device in the second communication apparatus may be obtained from the XR device.

The display capability of the XR device refers to a capability related to display of the XR device, for example, a resolution, a quantity of bits occupied by chroma information, a maximum horizontal angle of an image that can be displayed by the XR device, and a maximum vertical angle of the image that can be displayed by the XR device. If the XR device is located outside the terminal device, the display capability of the XR device does not exceed a display capability of the terminal device. If the XR device is located inside the terminal device, the display capability of the XR device is the same as a display capability of the terminal device.

The air interface load may be a data rate supported by a cell, or the like. Air interface load information in the second communication apparatus may be obtained from an AMF or an access network device. The AMF or the access network device may periodically report the air interface load information to the second communication apparatus. Alternatively, the AMF or the access network device may send a session request together with the air interface load information to the second communication apparatus. Alternatively, the second communication apparatus sends a request to the AMF or the access network device after receiving the session request, the AMF or the access network device reports the air interface load information to the second communication apparatus based on the request.

The image processing capability of the terminal device, the air interface load, and the display capability of the XR device may all be used to filter the QoS.

Specifically, for the image processing capability of the terminal device, the second communication apparatus may select QoS that supports the image processing capability of the terminal device. For example, the second communication apparatus may determine a rate requirement between the XR device and the second communication apparatus based on the image processing capability of the terminal device, and determine that QoS that meets the rate requirement serves as the M pieces of QoS. For example, if the terminal device supports distributed rendering and non-Fov, and needs a rate of approximately 1 Gbps, the second communication apparatus determines that QoS whose rate is greater than 1 Gbps is the M pieces of QoS.

For the air interface load, the second communication apparatus may select QoS that does not cause excessively heavy burden on air interface transmission as the M pieces of QoS. For example, if the air interface load is heavy, the second communication apparatus selects QoS with a low rate as the M pieces of QoS. If the air interface load is not heavy, to ensure transmission efficiency, the second communication apparatus may select QoS with a high rate as the M pieces of QoS.

For the display capability of the XR device, the second communication apparatus may select QoS within the display capability of the XR device as the M pieces of QoS. For example, the second communication apparatus may determine a maximum rate between the XR device and the second communication apparatus based on a resolution or another parameter of the XR device, and select QoS whose rate is less than the rate as the M pieces of QoS.

When the QoS is filtered by using more of the image processing capability of the terminal device, the air interface load, and the display capability of the XR device, corresponding selection rules may be combined, and details are not described again.

In Case 1, in some embodiments, the foregoing method further includes the following step.

Step 41: The second communication apparatus determines, based on the image processing capability of the terminal device, image processing parameters corresponding to M pieces of QoS.

In this embodiment of this application, an image processing parameter corresponding to one piece of QoS includes one or more of the following: an image rendering manner and an image transmission manner.

In some embodiments, an image rendering manner corresponding to each piece of QoS includes one or more of the following: local rendering, distributed rendering, and cloud rendering. In some embodiments, an image transmission manner corresponding to each piece of QoS includes one or more of the following: Fov and non-Fov.

During specific implementation of Step 41, the QoS determined by the second communication apparatus needs to be sufficient to support the XR device and the second communication apparatus in performing image data processing in an image rendering manner and/or an image transmission manner corresponding to the QoS.

For example, if the terminal device supports distributed rendering and non-Fov, and needs a rate of approximately 1 Gbps, it may be considered that an image rendering manner corresponding to QoS whose rate is greater than 1 Gbps in the filtered QoS is distributed rendering, and a supported image transmission manner is non-Fov. For another example, if the terminal device supports local rendering, distributed rendering, Fov, and non-Fov, the local rendering and Fov need a rate of approximately 25 Mbps, and the distributed rendering and non-Fov need a rate of approximately 1 Gbps, it may be considered that an image rendering manner corresponding to QoS whose rate is greater than 1 Gbps in the filtered QoS is distributed rendering and/or local rendering, and a corresponding image transmission manner is Fov and/or non-Fov, or it may be considered that an image rendering manner corresponding to QoS whose rate is greater than 25 Mbps and less than or equal to 1 Gbps in the filtered QoS is local rendering, and a corresponding image transmission manner is Fov.

It should be noted that all values related to the rate in this embodiment of this application are examples for description. During actual implementation, there may be another value. This is not limited.

For example, if there are five pieces of QoS (that is, M=5), Table 1 shows an example of image rendering manners and image transmission manners that are corresponding to the five pieces of QoS.

TABLE 1

| QoS | Image rendering manner | Image transmission manner |
| --- | --- | --- |
| QoS 1 | Local rendering and distributed rendering | Non-Fov and Fov |
| QoS 2 | Local rendering | Non-Fov |
| QoS 3 | Distributed rendering | Non-Fov and Fov |
| QoS 4 | Local rendering | Fov |
| QoS 5 | None | Non-Fov |

It should be noted that the image processing parameters corresponding to the M pieces of QoS may be determined by the second communication apparatus based on the image processing capability of the terminal device, or may be prestored in the second communication apparatus.

In Case 1, in some embodiments, the indication information is further used to indicate the image processing parameters corresponding to the M pieces of QoS.

The indication information may directly indicate the image processing parameters corresponding to the M pieces of QoS, or may indicate the image processing parameters corresponding to the M pieces of QoS by using identifiers indicating the M pieces of QoS. In this case, a correspondence between the identifiers of the M pieces of QoS and the image processing parameters corresponding to the M pieces of QoS may be stored in the first communication apparatus. The first communication apparatus determines, based on the identifiers of the M pieces of QoS, the M pieces of QoS and the image processing parameters corresponding to the M pieces of QoS.

In Case 1, Step 903 may be implemented in the following Manner 1 or Manner 2.

Manner 1: The first communication apparatus selects QoS with a highest priority from the M pieces of QoS as the first QoS.

Manner 2: The first communication apparatus selects one QoS from the M pieces of QoS as the first QoS based on another capability (for example, a rendering capability or a node capability) of the terminal device.

During specific implementation of Manner 2, for example, if the terminal device does not have the rendering capability, QoS whose corresponding rendering manner is cloud rendering is selected from the M pieces of QoS as the first QoS. If the terminal device tends to save power, QoS whose corresponding rendering manner is cloud rendering and/or distributed rendering is selected from the M pieces of QoS as the first QoS. For example, based on the example shown in Table 1, if the terminal device does not have the rendering capability, only QoS 5 can be selected as the first QoS.

Case 2: The second communication apparatus obtains the image processing capability of the terminal device.

In Case 2, in some embodiments, before Step 902, the foregoing method further includes the following step.

Step 51: The second communication apparatus determines the M pieces of QoS based on the image processing capability of the terminal device.

Further, during specific implementation, Step 51 may include: The second communication apparatus determines the M pieces of QoS based on the image processing capability of the terminal device and a display capability of the XR device. The display capability of the XR device in the second communication apparatus may be obtained from the XR device.

For specific implementation of Step 51, refer to Step 31. Details are not described again.

In Case 2, in some embodiments, the foregoing method further includes the following step.

Step 61: The second communication apparatus determines, based on the image processing capability of the terminal device, image processing parameters corresponding to the M pieces of QoS.

For specific implementation of Step 61, refer to Step 41. Details are not described again.

In Case 2, in some embodiments, the indication information is further used to indicate the image processing parameters corresponding to the M pieces of QoS. For descriptions related to the optional method, refer to Case 1. Details are not described again.

In Case 2, Step 903 may be implemented in Manner 1 or Manner 2, or may be implemented in the following Manner 3 or Manner 4.

Manner 3: The first communication apparatus selects one piece of QoS from the M pieces of QoS as the first QoS based on the air interface load.

During specific implementation of Manner 3, the first communication apparatus may select QoS that does not cause excessively heavy burden on air interface transmission as the first QoS. For example, if the air interface load is heavy, the first communication apparatus selects QoS with a low rate as the first QoS. If the air interface load is not heavy, to ensure transmission efficiency, the first communication apparatus may select QoS with a high rate as the first QoS. For example, if the first communication apparatus determines that bandwidth of a current cell can be used to transmit data of 100 Mbps, two users, namely, a user A and a user B, in the current cell are already transmitting data, a guaranteed rate for the user A is 20 Mbps, and a guaranteed rate for the user B is 50 Mbps, the first communication apparatus obtains through calculation that if a third user needs to transmit data, a guaranteed rate for the third user needs to be less than 30 Mbps. If the indication information indicates two types of QoS: QoS 1 and QoS 2, where a rate of QoS 1 is 50 Mbps, and a rate of QoS 2 is 20 Mbps, and if the first communication apparatus selects QoS 1, the guaranteed rates for the three users exceed a capacity of a cell. Therefore, the first communication apparatus can only select QoS 2.

It should be noted that the first communication apparatus may alternatively determine the first QoS with reference to Manner 2 and Manner 3, provided that corresponding selection rules are combined. Details are not described again.

In Manner 3, the first QoS is selected based on the air interface load with reference to the air interface load, so that more users can be supported, and user experience is improved.

Case 3: The second communication apparatus obtains neither the image processing capability of the terminal device nor the air interface load.

In Case 3, the first communication apparatus may obtain at least one of the image processing capability of the terminal device, the air interface load, and another capability (for example, a rendering capability or a node capability) of the terminal device.

In Case 3, the M pieces of QoS may be all QoS in the second communication apparatus.

In Case 3, Step 903 may be implemented in any one of Manner 1 to Manner 3 or in the following Manner 4.

Manner 4: The first communication apparatus determines the first QoS from the M pieces of QoS based on the image processing capability of the terminal device.

During specific implementation of Manner 4, the first communication apparatus may determine M' pieces of QoS from the M pieces of QoS based on the image processing capability of the terminal device, and then select one piece of QoS from the M' pieces of QoS as the first QoS, where M' is a positive integer less than or equal to M. A process of "determining the M' pieces of QoS from the M pieces of QoS" is similar to the process that "the second communication apparatus determines the M pieces of QoS based on the image processing capability of the terminal device" in Case 1. Details are not described again.

It should be noted that the first communication apparatus may alternatively determine the first QoS with reference to any two of Manner 2 to Manner 4 or Manner 2 to Manner 4, provided that corresponding selection rules are combined. For example, if Manner 4 is combined with another manner, after the M' pieces of QoS are determined in Manner 4, the first QoS may be determined from the M' pieces of QoS in the another manner. For example, if Manner 4 is combined with Manner 3, after the M' pieces of QoS are determined, the first communication apparatus may determine the first QoS from the M' pieces of QoS based on the air interface load.

After the first QoS is determined, image data processing between the second communication apparatus and the terminal device needs to be performed by using an image processing parameter corresponding to the first QoS. This may be specifically implemented in any one of the following Manner 1 to Manner 3.

Manner 1: The first communication apparatus sends the first QoS to the second communication apparatus. Correspondingly, the second communication apparatus receives the first QoS from the first communication apparatus, determines, based on the first QoS, the image processing parameter corresponding to the first QoS, processes image data by using one or more image processing parameters corresponding to the first QoS, and sends the one or more image processing parameters corresponding to the first QoS to the terminal device. When receiving the one or more image processing parameters corresponding to the first QoS, the terminal device processes image data by using the one or more image processing parameters corresponding to the first QoS.

In this embodiment of this application, the second communication apparatus and the terminal device may exchange an image processing parameter with each other by using an application layer.

For example, if an image rendering manner corresponding to the first QoS is distributed rendering, and a corresponding image transmission manner is Fov, the first communication apparatus and the terminal device process the image data by using the distributed rendering and Fov.

Manner 2: The first communication apparatus sends, to the second communication apparatus, one or more image processing parameters corresponding to the first QoS. Correspondingly, the second communication apparatus receives, from the first communication apparatus, the one or more image processing parameters corresponding to the first QoS, processes image data by using the one or more image processing parameters corresponding to the first QoS, and sends the one or more image processing parameters corresponding to the first QoS to the terminal device. When receiving the one or more image processing parameters corresponding to the first QoS, the terminal device processes image data by using the one or more image processing parameters corresponding to the first QoS.

Manner 3: The first communication apparatus sends, to the second communication apparatus and the terminal device, one or more image processing parameters corresponding to the first QoS. Correspondingly, the second communication apparatus and the terminal device receive, from the first communication apparatus, the one or more image processing parameters corresponding to the first QoS, and process image data by using the one or more image processing parameters corresponding to the first QoS.

In Manner 1 to Manner 3, in a subsequent process, if the XR device is located outside the terminal device, the terminal device may send, to the XR device, image data processed by using the one or more image processing parameters corresponding to the first QoS.

In the foregoing embodiment, if the QoS of the XR service changes (which is denoted as Scenario 1), the image processing parameter may also change. The following describes an example of a corresponding procedure in Scenario 1. If the image processing parameter changes (which is denoted as Scenario 2), the QoS of the XR service may also change. The following describes an example of a corresponding procedure in Scenario 2.

Scenario 1: The QoS of the XR service changes.

In a transmission process of the XR service, the first communication apparatus may update the QoS of the XR service when the air interface load changes.

In Scenario 1, when the QoS of the XR service changes from the first QoS to second QoS, the method further includes the following Method 1, Method 2, or Method 3. The second QoS may be one of the foregoing M pieces of QoS, or may be another piece of QoS. This is not limited in this application.

Method 1: The first communication apparatus sends the second QoS of the XR service to the second communication apparatus. Correspondingly, the second communication apparatus receives the second QoS from the first communication apparatus. The second communication apparatus determines, based on the second QoS, whether to update the image processing parameter. If the second communication apparatus determines to update the image processing parameter, the second communication apparatus determines, based on the second QoS, an image processing parameter corresponding to the second QoS. The second communication apparatus processes the image data by using one or more image processing parameters corresponding to the second QoS.

In Method 1, when the image processing parameters corresponding to the second QoS are the same as the image processing parameter corresponding to the first QoS, the second communication apparatus may determine not to update the image processing parameter. When the image processing parameters corresponding to the second QoS are not the same as the image processing parameter corresponding to the first QoS, the second communication apparatus may determine to update the image processing parameter.

Method 1 further includes: The second communication apparatus sends, to the terminal device, the one or more image processing parameters corresponding to the second QoS. Correspondingly, the terminal device receives, from the second communication apparatus, the one or more image processing parameters corresponding to the second QoS, and processes the image data by using the one or more image processing parameters corresponding to the second QoS.

Method 2: The first communication apparatus sends, to the second communication apparatus, one or more of image processing parameters corresponding to the second QoS of the XR service. Correspondingly, the second communication apparatus receives, from the first communication apparatus, the one or more image processing parameters corresponding to the first QoS of the XR service, and determines, based on the one or more image processing parameters corresponding to the second QoS, whether to update the image processing parameter. If the second communication apparatus determines to update the image processing parameter, the second communication apparatus processes the image data by using the one or more image processing parameters corresponding to the second QoS.

When a current image processing parameter is the same as the image processing parameter received from the first communication apparatus, the second communication apparatus may determine not to update the image processing parameter. When a current image processing parameter is not the same as the image processing parameter received from the first communication apparatus, the second communication apparatus may determine to update the image processing parameter.

Method 2 further includes: The second communication apparatus sends, to the terminal device, the one or more image processing parameters corresponding to the second QoS. Correspondingly, the terminal device receives, from the second communication apparatus, the one or more image processing parameters corresponding to the second QoS, and processes the image data by using the one or more image processing parameters corresponding to the second QoS.

Method 3: The first communication apparatus sends, to the second communication apparatus and the terminal device, one or more of image processing parameters corresponding to the second QoS. The second communication apparatus and the terminal device receive, from the first communication apparatus, the one or more image processing parameters corresponding to the second QoS, and process the image data by using the one or more image processing parameters corresponding to the second QoS.

It should be noted that, in Scenario 1, the QoS of the XR service may alternatively be updated when the terminal device hands over to an access network device. In this case, if the terminal device is handed over from a source access network device (wherein when the first communication apparatus is an access network device, the source access network device may be the access network device) to a target access network device, the second QoS may be determined by the target access network device, and actions performed by the first communication apparatus in Method 1 to Method 3 may be performed by the target access network device.

Scenario 2: The image processing parameter changes.

In Scenario 2, the foregoing method further includes the following steps.

Step 51: The second communication apparatus updates the image processing parameter. Specifically, the second communication apparatus updates an image rendering manner and/or an image transmission manner.

Step 52: The second communication apparatus sends an updated image processing parameter to the first communication apparatus and the terminal device. Correspondingly, the first communication apparatus and the terminal device obtain the updated image processing parameter from the second communication apparatus.

Step 53: The first communication apparatus updates the QoS of the XR service based on the updated image processing parameter.

Step 54: The terminal device processes the image data by using the updated image processing parameter.

During specific implementation of Step 53, the first communication apparatus may select QoS corresponding to the updated image processing parameter as updated QoS of the XR service.

In the foregoing embodiment, if the AMF determines the QoS, the AMF may notify the access network device of the determined QoS, and the access network device determines air interface parameters such as a delay and a packet error rate based on the determined QoS (for example, the first QoS or the second QoS), and performs air interface configuration (for example, configures an air interface DRB parameter for the terminal device).

In the foregoing embodiment, after the first communication apparatus determines the QoS (for example, the first QoS or the second QoS), the UPF sends a data packet to the access network device based on a rate in the determined QoS.

To make this embodiment of this application clearer, the following describes the foregoing method in this application by using Embodiment 1 to Embodiment 4 as examples.

Embodiment 1

Figure 10A:
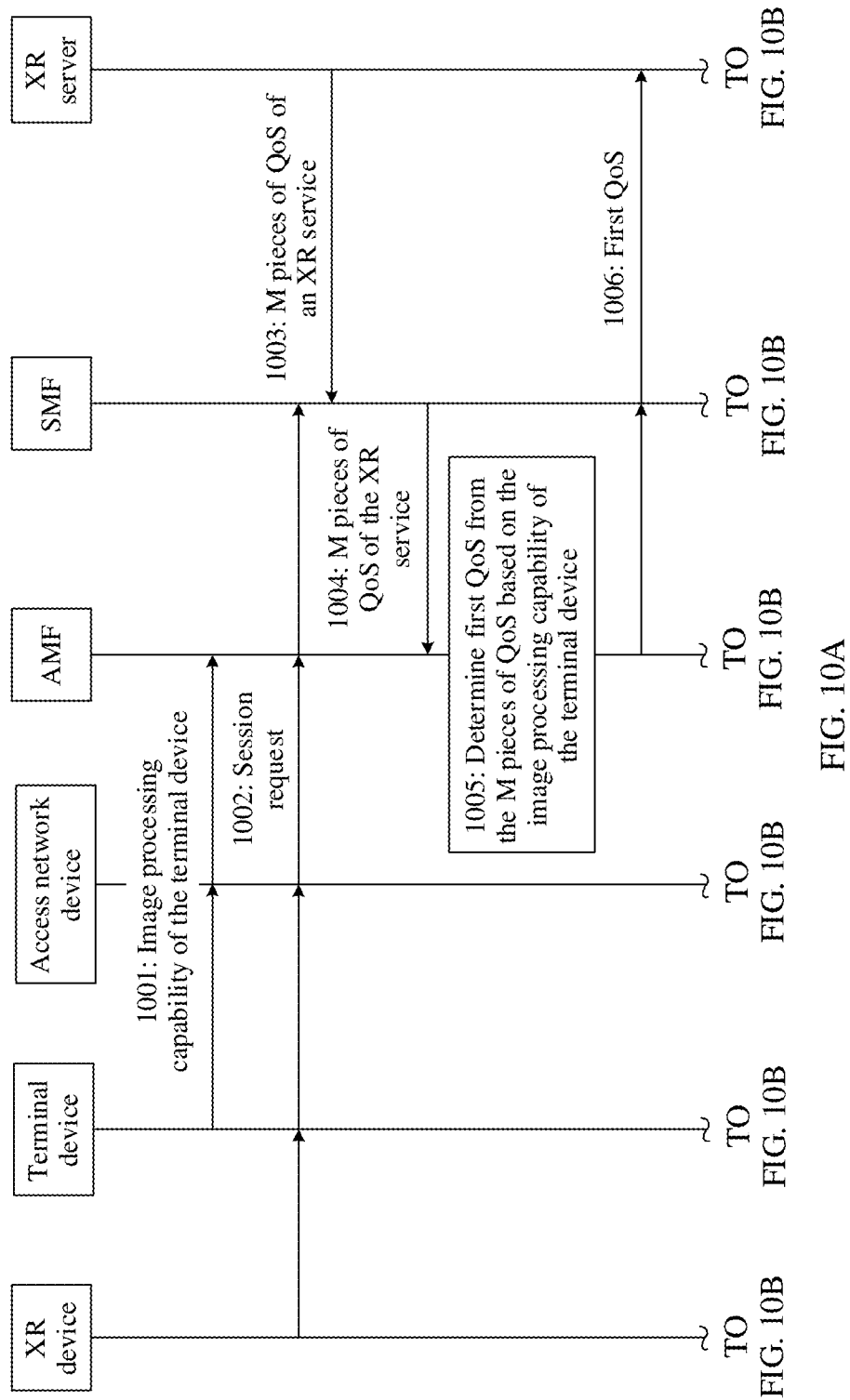
FIG. 10A and FIG. 10B are an interactive flowchart of another communication method according to at least an embodiment of this application.
Figure 10B:
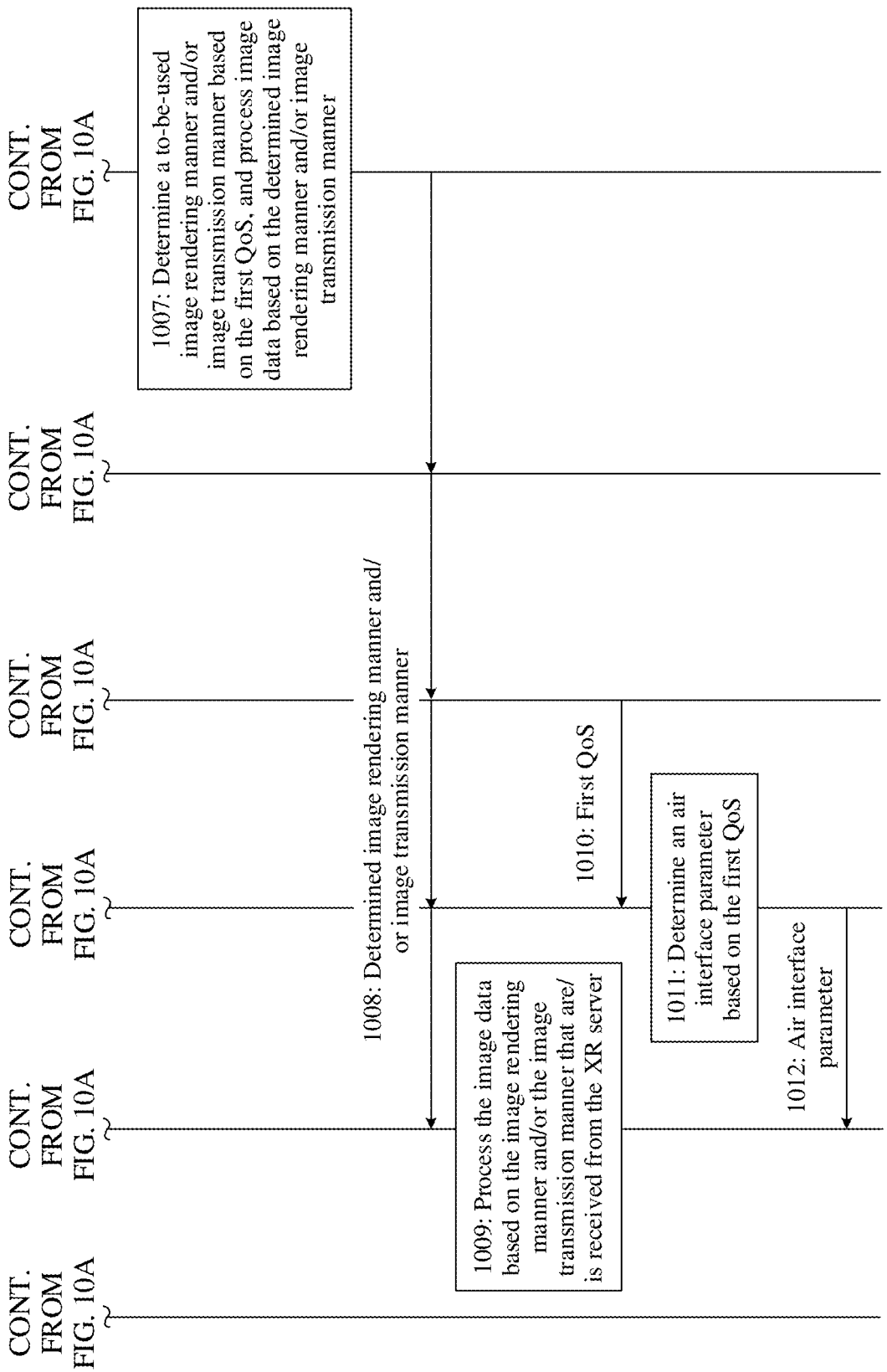

In Embodiment 1, an example in which the first communication apparatus is an AMF and the second communication apparatus is an XR server is used to describe of an implementation process of determining the QoS of the XR service and the image processing parameter used by the terminal device and the XR server in the foregoing method. Refer to FIG. 10A and FIG. 10B. The implementation process includes the following steps.

1001: The terminal device reports the image processing capability of the terminal device to the AMF.

For related descriptions of the image processing capability of the terminal device, refer to the foregoing descriptions. Details are not described again.

Step 1001 needs to be performed before Step 1005, and there is no specific execution sequence between Step 1001 and any one of Step 1002 to Step 1004.

1002: An XR device sends a session request (session request) to an SMF.

The session request sent by the XR device to the SMF may be transmitted to the SMF by using the terminal device, an access network device, and the AMF. The session request is used to request to establish a session.

The session request may carry an identifier of the XR service. The SMF may determine a requested XR service based on the identifier of the XR service.

1003: The SMF obtains the M pieces of QoS of the XR service from the XR server.

1004: The SMF sends the M pieces of QoS of the XR service to the AMF. Correspondingly, the AMF receives the M pieces of QoS of the XR service from the SMF.

1005: The AMF determines the first QoS from the M pieces of QoS based on the image processing capability of the terminal device.

For specific implementation of Step 1005, refer to Manner 4. Details are not described again.

In some embodiments, during specific implementation of Step 1005, the AMF may alternatively determine the first QoS from the M pieces of QoS based on the image processing capability of the terminal device and air interface load.

Air interface load information in the AMF may be obtained from the access network device.

1006: The AMF sends the first QoS to the XR server. Correspondingly, the XR server receives the first QoS from the AMF.

The AMF may communicate with the XR server by using the SMF.

1007: The XR server determines a to-be-used image rendering manner and/or image transmission manner based on the first QoS, and processes image data based on the determined image rendering manner and/or the image transmission manner.

The image rendering manner and/or the image transmission manner that are/is determined by the XR server are/is an image rendering manner and/or an image transmission manner that are/is corresponding to the first QoS.

Before processing the image data based on the determined image rendering manner and/or the image transmission manner, the XR server may prepare a corresponding image data processing module based on the determined image rendering manner and/or the image transmission manner, to subsequently perform image data processing.

1008: The XR server sends the determined image rendering manner and/or the image transmission manner to the terminal device. Correspondingly, the terminal device receives the determined image rendering manner and/or the image transmission manner from the XR server.

The XR server and the terminal device may communicate with each other by using the SMF, the AMF, and the access network device.

1009: The terminal device processes image data based on the image rendering manner and/or the image transmission manner that are/is received from the XR server.

Before Step 1009, the terminal device may prepare a corresponding image data processing module based on the image rendering manner and/or the image transmission manner that are/is received from the XR server, to subsequently perform image data processing.

1010: The AMF sends the first QoS to the access network device.

1011: The access network device determines an air interface parameter based on the first QoS.

1012: The access network device sends the air interface parameter to the terminal device.

Embodiment 2

Figure 11A:
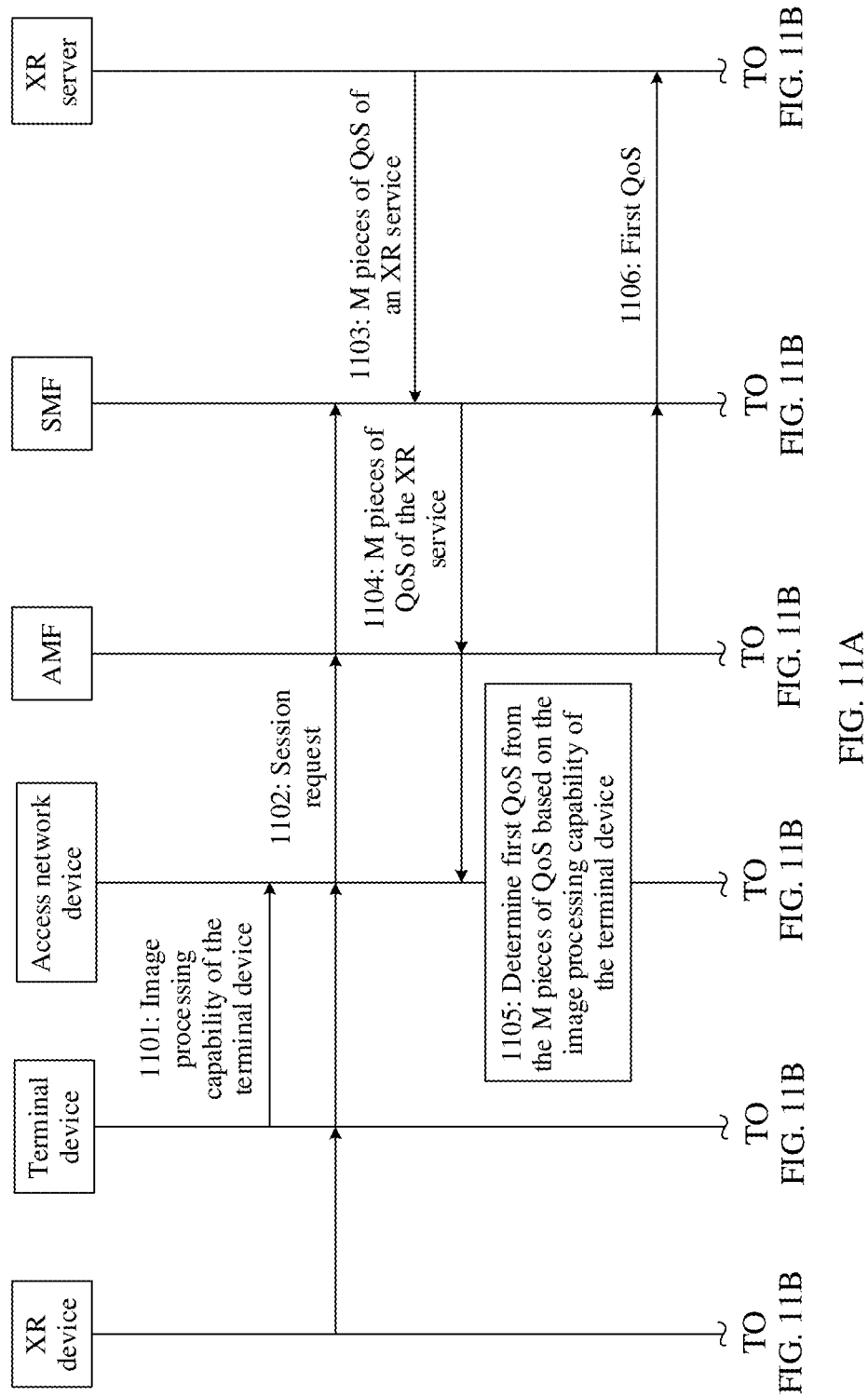
FIG. 11A and FIG. 11B are an interactive flowchart of still another communication method according to at least an embodiment of this application.
Figure 11B:
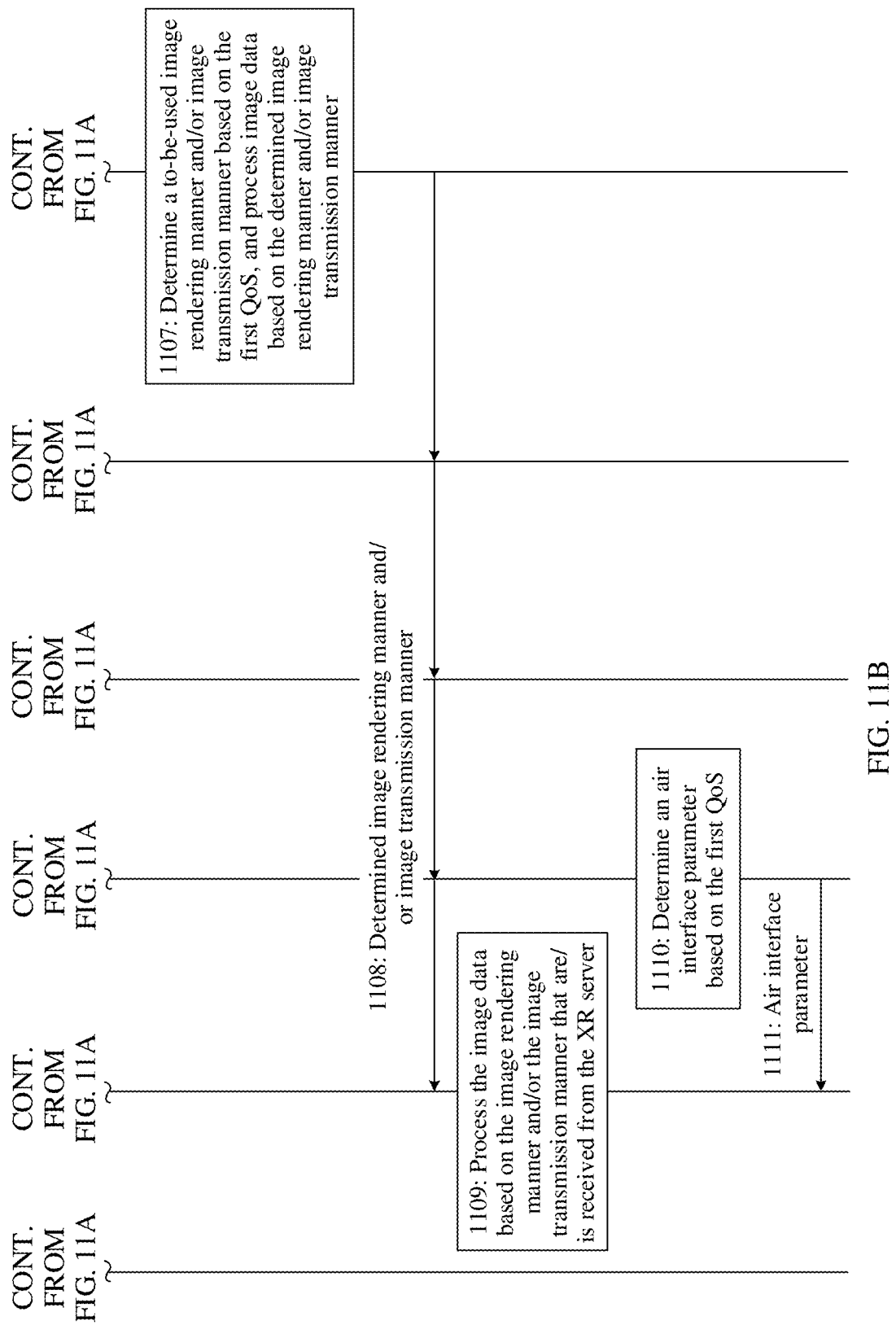

In Embodiment 2, an example in which the first communication apparatus is an access network device and the second communication apparatus is an XR server is used to describe an implementation process of determining the QoS of the XR service and the image processing parameter used by the terminal device and the XR server in the foregoing method. Refer to FIG. 11A and FIG. 11B. The implementation process includes the following steps.

1101: The terminal device reports the image processing capability of the terminal device to the access network device.

For related descriptions of the image processing capability of the terminal device, refer to the foregoing descriptions. Details are not described again.

Step 1101 needs to be performed before Step 1105, and there is no specific execution sequence between Step 1001 and any one of Step 1102 to Step 1104.

1102: This step is the same as Step 1002.

1103: This step is the same as Step 1003.

1104: An SMF sends the M pieces of QoS of the XR service to the access network device. Correspondingly, the access network device receives the M pieces of QoS of the XR service from the SMF.

The SMF may send the M pieces of QoS to the access network device by using an AMF.

1105: The access network device determines the first QoS from the M pieces of QoS based on the image processing capability of the terminal device.

For specific implementation of Step 1105, refer to Manner 4. Details are not described again.

In some embodiments, during specific implementation of Step 1105, the access network device may alternatively determine the first QoS from the M pieces of QoS based on the image processing capability of the terminal device and air interface load.

1106: The access network device sends the first QoS to the XR server. Correspondingly, the XR server receives the first QoS from the access network device.

The access network device may communicate with the XR server by sequentially using the AMF and the SMF.

1107: This step is the same as Step 1007.
1108: This step is the same as Step 1008.
1109: This step is the same as Step 1009.
1110: The access network device determines an air interface parameter based on the first QoS.
1111: The access network device sends the air interface parameter to the terminal device.

Embodiment 3

Figure 12:
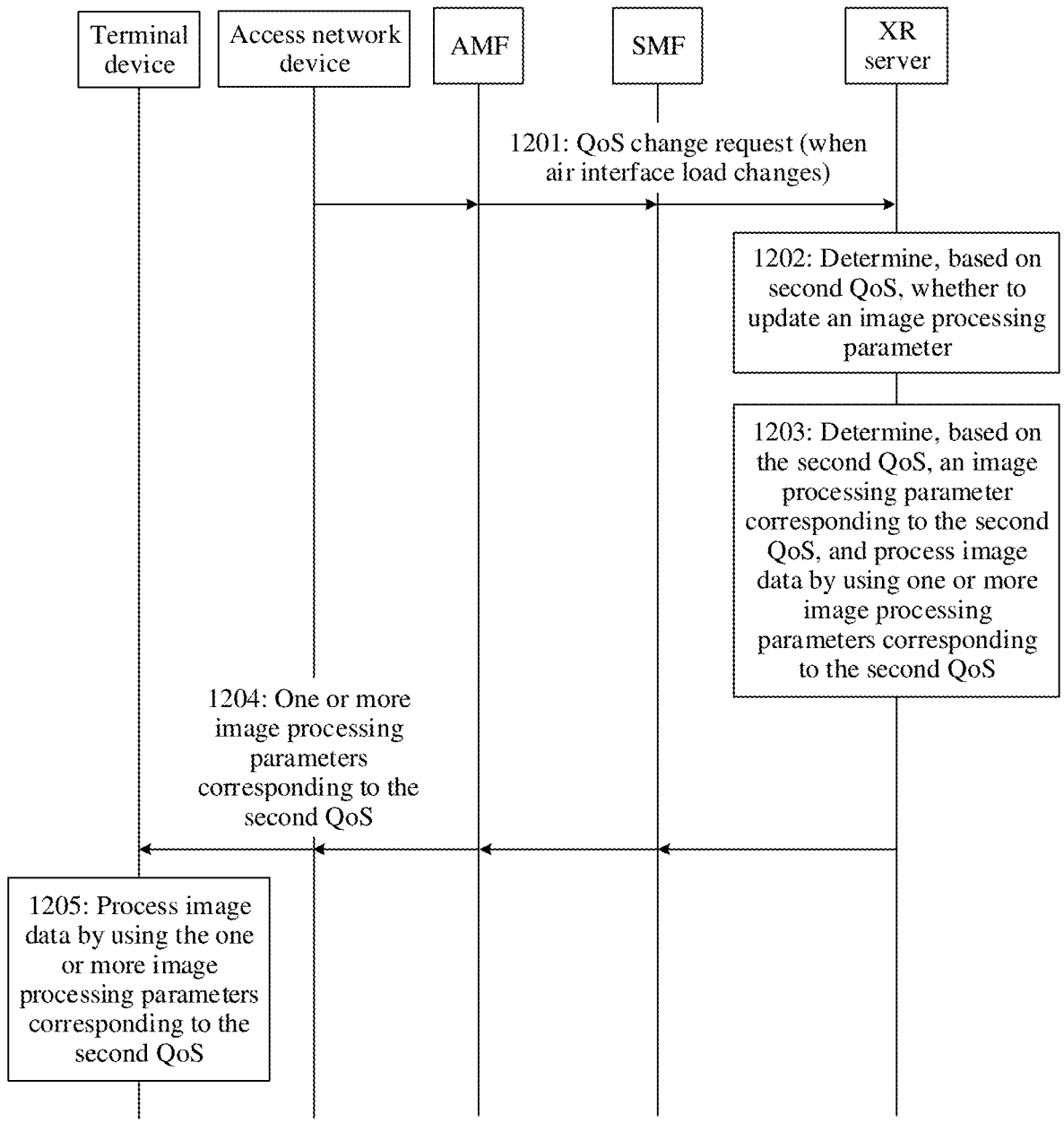
FIG. 12 is an interactive flowchart of yet another communication method according to at least an embodiment of this application.

In Embodiment 3, an example is provided for description of a QoS update procedure and an image processing parameter update procedure that are initiated by an access network device when air interface load changes. Refer to FIG. 12. A method includes the following steps.

1201: When finding that the air interface load changes, the access network device sends a QoS change request to an XR server.

The access network device may transmit the QoS change request to the XR server by sequentially using an AMF and an SMF. The QoS change request may include second QoS determined by the access network device. The second QoS may be one of the foregoing M pieces of QoS, or may be QoS generated by the access network device. This is not limited in this application.

1202: The XR server determines, based on the second QoS, whether to update an image processing parameter.

If the XR server determines to update the image processing parameter, Step 1203 is performed. If the XR server determines not to update the image processing parameter, no further action is needed. FIG. 12 is drawn by using an example in which the XR server determines, based on the second QoS, to update the image processing parameter.

1203: The XR server determines, based on the second QoS, an image processing parameter corresponding to the second QoS, and processes image data by using one or more image processing parameters corresponding to the second QoS.

The one or more image processing parameters corresponding to the second QoS may be an image rendering manner and/or an image transmission manner corresponding to the second QoS.

1204: The XR server sends, to a terminal device, one or more image processing parameters corresponding to the second QoS. Correspondingly, the terminal device receives, from the XR server, the one or more image processing parameters corresponding to the second QoS.

1205: The terminal device processes image data by using the one or more image processing parameters corresponding to the second QoS.

In a subsequent process, if an XR device is located outside the terminal device, the terminal device may send, to the XR device, image data processed by using the one or more image processing parameters corresponding to the second QoS.

Embodiment 4

Figure 13:
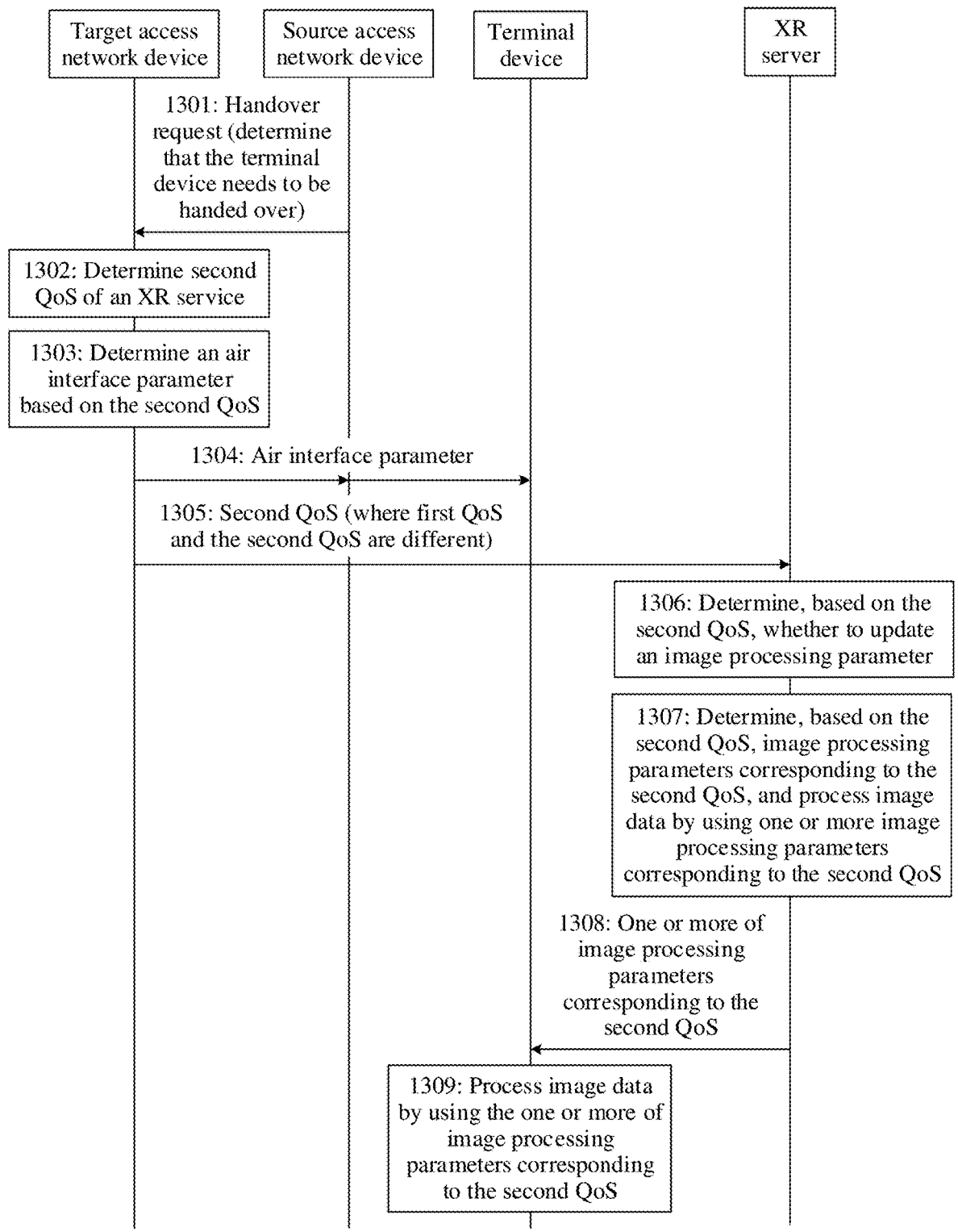
FIG. 13 is an interactive flowchart of still another communication method according to at least an embodiment of this application.

In Embodiment 4, an example is provided for description of a QoS update procedure and an image processing parameter update procedure when a terminal device needs to hand over to an access network device. Refer to FIG. 13. A method includes the following steps.

1301: A source access network device determines that the terminal device needs to be handed over, and sends a handover request to a target access network device.

The handover request may include M pieces of QoS and first QoS.

1302: The target access network device determines second QoS of an XR service.

The target access network device may select the second QoS based on an air interface load status of the target access network device. The second QoS may be one of the foregoing M pieces of QoS, or may be another piece of QoS. This is not limited in this application. The first QoS and the second QoS may be same QoS, or may be different QoS.

1303: The target access network device determines an air interface parameter based on the second QoS.

1304: The target access network device sends the air interface parameter to the terminal device by using the source access network device.

The target access network device may transparently transmit (namely, transparently transmit) the air interface parameter to the terminal device by using the source access network device. To be specific, after the target access network device sends the air interface parameter to the source access network device, the source access network device directly sends the air interface parameter to the terminal device without parsing the air interface parameter.

1305: If the first QoS and the second QoS are different QoS, the target access network device sends the second QoS to an XR server.

Steps 1306 to 1309 are respectively the same as Steps 1202 to 1205.

In the foregoing embodiment, if the first communication apparatus is an access network device, and the access network device is of an architecture in which a DU and a CU are separated, an action performed by the access network device may be performed by the CU.

The foregoing mainly describes the solutions in embodiments of this application from a perspective of interaction between network elements. It may be understood that, to implement the foregoing functions, the network elements, for example, the first communication apparatus and the second communication apparatus, include at least one of a corresponding hardware structure or software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the first communication apparatus and the second communication apparatus may be divided into functional units based on the foregoing method examples. For example, each functional unit may be obtained through division based on each corresponding function, or two or more functions may be integrated into one processing unit. The foregoing integrated unit may be implemented in a form of hardware, or may be implemented in a form of a software functional unit. It should be noted that, in this embodiment of this application, division into the units is an example, and is merely a logical function division. In actual implementation, another division manner may be used.

Figure 14:
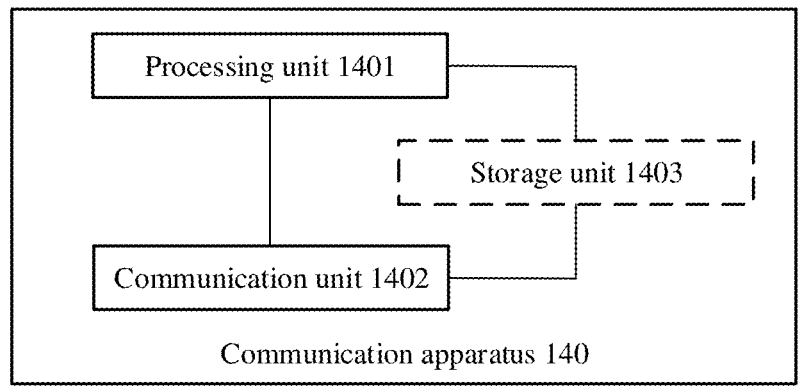
FIG. 14 is a schematic diagram of composition of a communication apparatus according to at least an embodiment of this application.

When an integrated unit is used, FIG. 14 is a schematic diagram of a possible structure of a communication apparatus (which is denoted as a communication apparatus 140) in the foregoing embodiments. The communication apparatus 140 includes a processing unit 1401 and a communication unit 1402, and may further include a storage unit 1403. The schematic diagram of the structure shown in FIG. 14 may be used to show structures of the first communication apparatus and the second communication apparatus in the foregoing embodiments.

When the schematic diagram of the structure shown in FIG. 14 is used to show the structure of the first communication apparatus in the foregoing embodiments, the processing unit 1401 is configured to control and manage actions of the first communication apparatus. For example, the processing unit 1401 is configured to perform 901 and 902 in FIGS. 9, 1001, 1002, 1004, 1005, 1006, 1008, and 1010 in FIG. 10A and FIG. 10B (in this case, the first communication apparatus is an AMF), 1101, 1102, 1104, 1105, 1108, 1110 and 1111 in FIG. 11A and FIG. 11B (in this case, the first communication apparatus is an access network device), 1201 and 1204 in FIG. 12 (in this case, the first communication apparatus is an access network device or an AMF), and/or actions performed by the first communication apparatus in another process described in embodiments of this application. The processing unit 1401 may communicate with another network entity by using the communication unit 1402, for example, communicate with the second communication apparatus shown in FIG. 9. The storage unit 1403 is configured to store program code and data that are of the first communication apparatus.

When the schematic diagram of the structure shown in FIG. 14 is used to show the structure of the first communication apparatus in the foregoing embodiments, the communication apparatus 140 may be a device (for example, an AMF or an access network device), or may be a chip in the device.

When the schematic diagram of the structure shown in FIG. 14 is used to show the structure of the second communication apparatus in the foregoing embodiments, the processing unit 1401 is configured to control and manage actions of the second communication apparatus. For example, the processing unit 1401 is configured to perform 902 and 903 in FIGS. 9, 1003, 1006, 1007, and 1008 in FIG. 10A and FIGS. 10B, 1103, 1106, 1107, and 1108 in FIG. 11A and FIG. 11B, 1201 to 1204 in FIG. 12, 1305 to 1308 in FIG. 13, and/or actions performed by the second communication apparatus in another process described in embodiments of this application. The processing unit 1401 may communicate with another network entity by using the communication unit 1402, for example, communicate with the first communication apparatus shown in FIG. 9. The storage unit 1403 is configured to store program code and data that are of the second communication apparatus.

When the schematic diagram of the structure shown in FIG. 14 is used to show the structure of the second communication apparatus in the foregoing embodiments, the communication apparatus 140 may be a device (for example, an XR server), or may be a chip in the device.

When the communication apparatus 140 is a device, the processing unit 1401 may be a processor or a controller, and the communication unit 1402 may be a communication interface, a transceiver, a transceiver machine, a transceiver circuit, a transceiver apparatus, or the like. The communication interface is a general term, and may include one or more interfaces. The storage unit 1403 may be a memory. When the communication apparatus 140 is a chip in a device, the processing unit 1401 may be a processor or a controller, and the communication unit 1402 may be an input interface and/or an output interface, a pin, a circuit, or the like. The storage unit 1403 may be a storage unit (for example, a register or a cache) in the chip, or may be a storage unit (for example, a read-only memory (ROM) or a random access memory (RAM)) that is in the device and that is located outside the chip.

The communication unit may also be referred to as a transceiver unit. An antenna and a control circuit that have receiving and sending functions in the communication apparatus 140 may be considered as the communication unit 1402 of the communication apparatus 140, and a processor that has a processing function may be considered as the processing unit 1401 of the communication apparatus 140. In some embodiments, a component that is in the communication unit 1402 and that is configured to implement a receiving function may be considered as a receiving unit. The receiving unit is configured to perform a receiving step in embodiments of this application. The receiving unit may be a receiver machine, a receiver, a receiver circuit, or the like. A component that is in the communication unit 1402 and that is configured to implement a sending function may be considered as a sending unit. The sending unit is configured to perform a sending step in embodiments of this application. The sending unit may be a transmitter machine, a transmitter, a transmitter circuit, or the like.

When the integrated unit in FIG. 14 is implemented in a form of a software function module and sold or used as an independent product, the integrated unit may be stored in a computer-readable storage medium. Based on such an understanding, the technical solutions of embodiments of this application essentially, or the part contributing to the technology of some approaches, or all or some of the technical solutions may be implemented in a form of a software product. The computer software product is stored in a storage medium, and includes a plurality of instructions for instructing a computer device (which may be a personal computer, a server, a network device, or the like) or a processor (processor) to perform all or some of the steps of the methods described in embodiments of this application. The storage medium storing the computer software product includes any medium that can store program code, such as a USB flash drive, a removable hard disk, a read-only memory, a random access memory, a magnetic disk, or an optical disc.

The unit in FIG. 14 may also be referred to as a module. For example, the processing unit may be referred to as a processing module.

Figure 15:
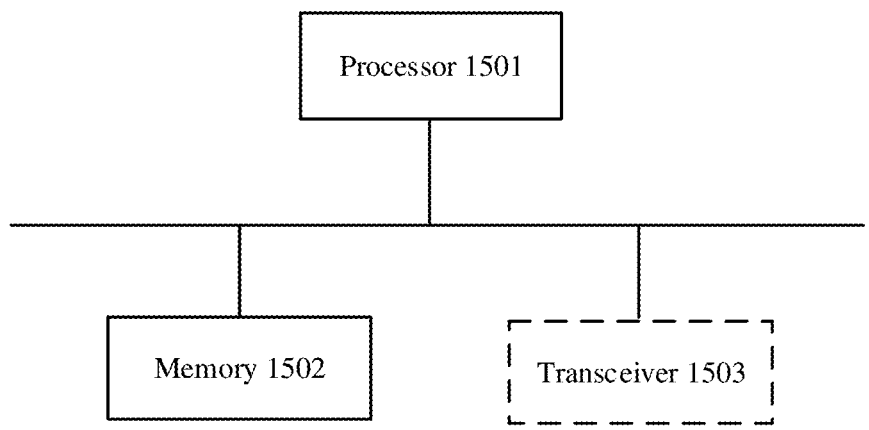
FIG. 15 is a schematic diagram of a hardware structure of a communication apparatus according to at least an embodiment of this application.
Figure 16:
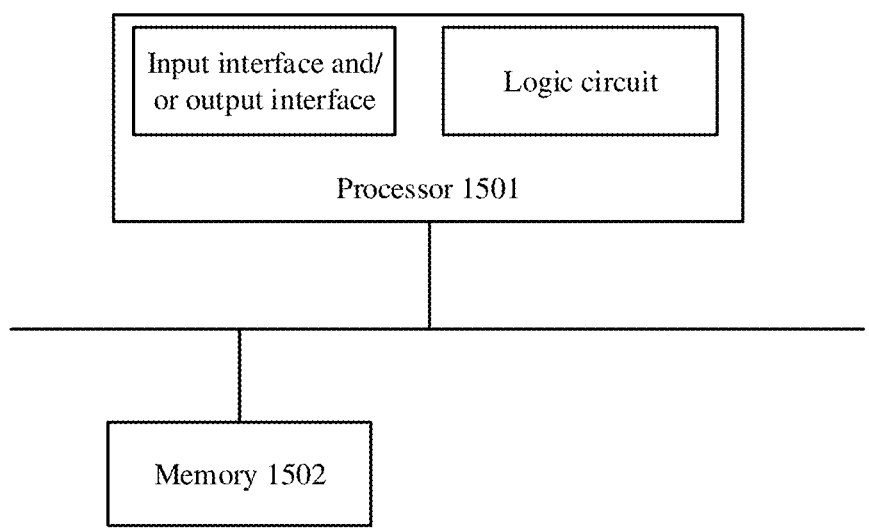
FIG. 16 is a schematic diagram of a hardware structure of another communication apparatus according to at least an embodiment of this application.

An embodiment of this application further provides a schematic diagram of a hardware structure of a communication apparatus. As shown in FIG. 15 or FIG. 16, the communication apparatus includes a processor 1501, and in some embodiments, further includes a memory 1502 connected to the processor 1501.

The processor 1501 may be a general-purpose central processing unit (CPU), a microprocessor, an application-specific integrated circuit (ASIC), or one or more integrated circuits configured to control program execution of the solutions of this application. The processor 1501 may alternatively include a plurality of CPUs, and the processor 1501 may be a single-core (single-CPU) processor or a multi-core (multi-CPU) processor. The processor herein may refer to one or more devices, circuits, or processing cores configured to process data (for example, computer program instructions).

The memory 1502 may be a ROM or another type of static storage device that can store static information and instructions, or a RAM or another type of dynamic storage device that can store information and instructions, or may be an electrically erasable programmable read-only memory (EEPROM), a compact disc read-only memory (CD-ROM) or another compact disc storage, an optical disc storage (which includes a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. This is not limited in embodiments of this application. The memory 1502 may exist independently, or may be integrated with the processor 1501. The memory 1502 may include computer program code. The processor 1501 is configured to execute the computer program code stored in the memory 1502, to implement the method provided in embodiments of this application.

In a first possible implementation, as shown in FIG. 15, the communication apparatus further includes a transceiver 1503. The processor 1501, the memory 1502, and the transceiver 1503 are connected through a bus. The transceiver 1503 is configured to communicate with another device or a communication network. In some embodiments, the transceiver 1503 may include a transmitter and a receiver. A component configured to implement a receiving function in the transceiver 1503 may be considered as a receiver machine. The receiver machine is configured to perform a receiving step in embodiments of this application. A component configured to implement a sending function in the transceiver 1503 may be considered as a transmitter machine. The transmitter machine is configured to perform a sending step in embodiments of this application.

Based on the first possible implementation, the schematic diagram of the structure shown in FIG. 15 may be used to show structures of the first communication apparatus and the second communication apparatus in the foregoing embodiments.

When the schematic diagram of the structure shown in FIG. 15 is used to show the structure of the first communication apparatus in the foregoing embodiments, the processor 1501 is configured to control and manage actions of the first communication apparatus. For example, the processor 1501 is configured to support the first communication apparatus in performing 901 and 902 in FIGS. 9, 1001, 1002, 1004, 1005, 1006, 1008, and 1010 in FIG. 10A and FIG. 10B (in this case, the first communication apparatus is an AMF), 1101, 1102, 1104, 1105, 1108, 1110 and 1111 in FIG. 11A and FIG. 11B (in this case, the first communication apparatus is an access network device), 1201 and 1204 in FIG. 12 (in this case, the first communication apparatus is an access network device or an AMF), and/or actions performed by the first communication apparatus in another process described in embodiments of this application. The processor 1501 may communicate with another network entity by using the transceiver 1503, for example, communicate with the second communication apparatus shown in FIG. 9. The memory 1502 is configured to store program code and data that are of the first communication apparatus.

When the schematic diagram of the structure shown in FIG. 15 is used to show the structure of the second communication apparatus in the foregoing embodiments, the processor 1501 is configured to control and manage actions of the second communication apparatus. For example, the processor 1501 is configured to support the second communication apparatus in performing 902 and 903 in FIGS. 9, 1003, 1006, 1007, and 1008 in FIG. 10A and FIGS. 10B, 1103, 1106, 1107, and 1108 in FIG. 11A and FIG. 11B, 1201 to 1204 in FIG. 12, 1305 to 1308 in FIG. 13, and/or actions performed by the second communication apparatus in another process described in embodiments of this application. The processor 1501 may communicate with another network entity by using the transceiver 1503, for example, communicate with the first communication apparatus shown in FIG. 9. The memory 1502 is configured to store program code and data that are of the second communication apparatus.

In a second possible implementation, the processor 1501 includes a logic circuit and at least one of an input interface and an output interface. The output interface is configured to perform a sending action in a corresponding method, and the input interface is configured to perform a receiving action in the corresponding method.

Based on the second possible implementation, the schematic diagram of the structure shown in FIG. 16 may be used to show structures of the first communication apparatus and the second communication apparatus in the foregoing embodiments.

When the schematic diagram of the structure shown in FIG. 16 is used to show the structure of the first communication apparatus in the foregoing embodiments, the processor 1501 is configured to control and manage actions of the first communication apparatus. For example, the processor 1501 is configured to support the first communication apparatus in performing 901 and 902 in FIGS. 9, 1001, 1002, 1004, 1005, 1006, 1008, and 1010 in FIG. 10A and FIG. 10B (in this case, the first communication apparatus is an AMF), 1101, 1102, 1104, 1105, 1108, 1110 and 1111 in FIG. 11A and FIG. 11B (in this case, the first communication apparatus is an access network device), 1201 and 1204 in FIG. 12 (in this case, the first communication apparatus is an access network device or an AMF), and/or actions performed by the first communication apparatus in another process described in embodiments of this application. The processor 1501 may communicate with another network entity by using at least one of an input interface and an output interface, for example, communicate with the second communication apparatus shown in FIG. 9. The memory 1502 is configured to store program code and data that are of the first communication apparatus.

When the schematic diagram of the structure shown in FIG. 16 is used to show the structure of the second communication apparatus in the foregoing embodiments, the processor 1501 is configured to control and manage actions of the second communication apparatus. For example, the processor 1501 is configured to support the second communication apparatus in performing 902 and 903 in FIGS. 9, 1003, 1006, 1007, and 1008 in FIG. 10A and FIGS. 10B, 1103, 1106, 1107, and 1108 in FIG. 11A and FIG. 11B, 1201 to 1204 in FIG. 12, 1305 to 1308 in FIG. 13, and/or actions performed by the second communication apparatus in another process described in embodiments of this application. The processor 1501 may communicate with another network entity by using at least one of an input interface and an output interface, for example, communicate with the first communication apparatus shown in FIG. 9. The memory 1502 is configured to store program code and data that are of the second communication apparatus.

In an implementation process, the steps of the methods in embodiments may be completed by using a hardware integrated logic circuit in the processor, or by using instructions in a form of software. The steps of the method disclosed with reference to embodiments of this application may be directly performed by a hardware processor, or may be performed by using a combination of hardware in the processor and a software module.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication apparatus, including a processor and an interface. The processor is coupled to a memory through the interface. When the processor executes a computer program or computer-executable instructions in the memory, any one of the foregoing methods is performed.

An embodiment of this application further provides a communication system, including a first communication apparatus and a second communication apparatus.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, all or some of the procedures or functions in embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clearly that a person skilled in the art can make various modifications and variations to this application without departing from the spirit and scope of this application. In this way, this application is intended to cover these modifications and variations of this application provided that they fall within the scope of the claims of this application and their equivalent technologies.

What is claimed is:

1. A communication method by a first communication apparatus that is one of a core network device or an access network device, wherein the communication method comprises:
   receiving, by a first communication apparatus, indication information from a second communication apparatus, the indication information is useable to indicate at least one piece of quality of service (QoS) of an extended reality (XR) service for data communicated between an XR device that receives data of the XR service or that sends data of the XR service and the second communication apparatus is comprising an XR server or a chip in the XR server; and
   determining, by the first communication apparatus, a first QoS of the XR service based on the at least one piece of QoS of the XR service, wherein determining the first QoS of the XR service comprises obtaining:
      an image rendering manner supported by the terminal device,
      an image transmission manner supported by the terminal device, or
      an image processing preference of the terminal device.

2. The communication method according to claim 1, wherein the indication information is further useable to indicate an image processing parameter corresponding to the at least one piece of QoS of the XR service, and the image processing parameter comprises:
   an image rendering manner; or
   an image transmission manner.

3. The communication method according to claim 2, wherein the method further comprises:
   sending, by the first communication apparatus, the first QoS of the XR service to the second communication apparatus.

4. The communication method according to claim 2, wherein the communication method further comprises:
   sending, by the first communication apparatus, a second QoS of the XR service to the second communication apparatus in response to the QoS of the XR service changing from the first QoS of the XR service to the second QoS of the XR service.

5. The communication method according to claim 1, wherein
   obtaining the image processing preference of the terminal device comprises obtaining:
      the image rendering manner preferred by the terminal device, or
      the image transmission manner preferred by the terminal device.

6. The communication method according to claim 5, further comprising:
  determining, by the first communication apparatus, the first QoS of the XR service based on the at least one piece of QoS of the XR service and the image processing capability,
  wherein the obtaining, by the first communication apparatus, the image processing capability of the terminal device comprises:
    receiving, by the first communication apparatus, the image processing capability from the terminal device.

7. The communication method according to claim 5, wherein the terminal device fails to support image rendering in response to the image processing capability failing to comprise the image rendering manner supported by the terminal device.

8. A first apparatus, wherein the first apparatus is one of a core network device or an access network device, the first apparatus comprising:
  one or more processors; and
  a non-transitory memory coupled to the one or more processors, and being configured to store non-transitory instructions, and the one or more processors being configured to execute the non-transitory instructions thereby causing the first apparatus to:
  receive indication information from a second apparatus, wherein the indication indicates at least one piece of quality of service (QoS) of an extended reality (XR) service, an XR device receives data of the XR service or sends data of the XR service by a terminal device, and the second apparatus is an XR server or a chip in the XR server; and
  determine a first QoS of the XR service based on the at least one piece of QoS of the XR service, wherein determining the first QoS of the XR service comprises obtaining:
    an image rendering manner supported by the terminal device,
    an image transmission manner supported by the terminal device, or
    an image processing preference of the terminal device.

9. The first apparatus according to claim 8, wherein the indication information is further useable to indicate an image processing parameter corresponding to the at least one piece of QoS of the XR service, and the image processing parameter comprises:
  an image rendering manner, or
  an image transmission manner.

10. The first apparatus according to claim 9, wherein the one or more processors further configured to execute the non-transitory instructions thereby further causing the first apparatus to:
  send the first QoS of the XR service to the second apparatus.

11. The first apparatus according to claim 9, wherein the one or more processors further configured to execute the non-transitory instructions thereby further causing the first apparatus to:
  send a second QoS of the XR service to the second apparatus in response to the QoS of the XR service changing from the first QoS of the XR service to the second QoS of the XR service.

12. The first apparatus according to claim 8, wherein the one or more processors further configured to execute the non-transitory instructions thereby further causing the first apparatus to:
  obtain an image processing capability of the terminal device, wherein the image processing capability comprises:
    wherein obtaining an image processing preference of the terminal device comprises obtaining:
      an image rendering manner preferred by the terminal device, or
      an image transmission manner preferred by the terminal device; and
  wherein the first apparatus determineing the first QoS of the XR service based on the at least one piece of QoS of the XR service, comprises:
    the one or more processors further configured to execute the non-transitory instructions thereby further causing the first apparatus to determine the first QoS of the XR service based on the at least one piece of QoS of the XR service and the image processing capability.

13. The first apparatus according to claim 12, wherein the one or more processors configured to execute the non-transitory instructions thereby causing the first apparatus to obtain the image processing capability of the terminal device, comprises:
  the one or more processors being further configured to execute the non-transitory instructions thereby further causing the first apparatus to receive the image processing capability from the terminal device.

14. The first apparatus according to claim 12, wherein the terminal device fails to support image rendering in response to the image processing capability failing to comprise the image rendering manner supported by the terminal device.

15. A non-transitory computer readable medium, wherein the non-transitory computer readable medium is configured to store non-transitory instructions, and in response to the non-transitory instructions being executed by a processor on a first communication apparatus, the processor is configured to perform operations comprising:
  receiving indication information from a second communication apparatus, wherein the first communication apparatus is a core network device or an access network device, the indication information indicates at least one piece of quality of service (QoS) of an extended reality (XR) service, an XR device receives data of the XR service or sends data of the XR service by a terminal device, and the second communication apparatus is an XR server or a chip in the XR server; and
  determining a first QoS of the XR service based on the at least one piece of QoS of the XR service wherein determining the first QoS of the XR service comprises obtaining:
    an image rendering manner supported by the terminal device,
    an image transmission manner supported by the terminal device, or
    an image processing preference of the terminal device.

16. The non-transitory computer readable medium according to claim 15, wherein the indication information is further useable to indicate an image processing parameter corresponding to the at least one piece of QoS of the XR service, and the image processing parameter comprises:
  an image rendering manner, or
  an image transmission manner.

17. The non-transitory computer readable medium according to claim 16, wherein the processor is further configured to perform operations further comprising:
  sending the first QoS of the XR service to the second communication apparatus.

18. The non-transitory computer readable medium according to claim 15, wherein the processor is further configured to perform operations further comprising:
- obtaining an image processing capability of the terminal device, wherein the image processing capability comprises:
  - obtaining an image processing preference of the terminal device that comprises:
    - the image rendering manner preferred by the terminal device, or
    - an image transmission manner preferred by the terminal device; and
- wherein the processor is configured to perform operations comprising the determining the first QoS of the XR service based on the at least one piece of QoS of the XR service comprises:
- the processor being further configured to perform operations further comprising determining the first QoS of the XR service based on the at least one piece of QoS of the XR service and the image processing capability.

19. The non-transitory computer readable medium according to claim 18, wherein the processor configured to perform operations comprising the obtaining the image processing capability of the terminal device comprises:
- the processor being further configured to perform operations further comprising receiving the image processing capability from the terminal device.

20. The non-transitory computer readable medium according to claim 18, wherein the terminal device fails to support image rendering in response to the image processing capability failing to comprise the image rendering manner supported by the terminal device.

* * * * *